United States Patent [19]
Wong

[11] Patent Number: 4,825,452
[45] Date of Patent: Apr. 25, 1989

[54] DIGITAL FSK DEMODULATOR

[75] Inventor: Hee Wong, San Jose, Calif.

[73] Assignee: National Semiconductor Corporation, Santa Clara, Calif.

[21] Appl. No.: 21,907

[22] Filed: Mar. 4, 1987

[51] Int. Cl.⁴ .................... H03K 7/08; H04L 27/14
[52] U.S. Cl. ........................... 375/22; 375/88; 375/91; 329/126
[58] Field of Search ............... 375/82, 88, 91, 80, 375/94, 102, 22, 23, 21; 329/126, 128; 340/825.63, 347 DD, 347 AD; 370/9–11

[56] References Cited
U.S. PATENT DOCUMENTS

| | | | |
|---|---|---|---|
| 3,559,083 | 1/1971 | Crouse | 329/128 |
| 4,115,738 | 9/1978 | Mitarai et al. | 329/126 |
| 4,485,347 | 11/1984 | Hirasawa et al. | 375/88 |
| 4,583,239 | 4/1986 | Vance | 375/94 |

Primary Examiner—Robert L. Griffin
Assistant Examiner—Marianne Huseman
Attorney, Agent, or Firm—Limbach, Limbach & Sutton

[57] ABSTRACT

The present invention provides a digital frequency shift keying (FSK) demodulator circuit which receives a hard-limited FSK input signal and recovers the modulating baseband signal at 300 baud or less. The FSK demodulator includes a digital phase locked loop demodulator section which receives the FSK input signal and generates a pulse width modulated output the frequency of which is a function of the input signal frequency. The output of the PLL demodulator section is provided to a quantizer which generates a set of parallel numbers. A translating means, for example a code linearizer, converts the parallel numbers into corresponding parallel outputs which are representative of the frequency of the FSK input signal. The parallel outputs are processed by a digital filter which emulates a second-order, low-pass filter. The filter processes the parallel outputs utilizing pulse density modulation. A deglitcher removes noise from the filter output to provide the demodulated data output.

10 Claims, 16 Drawing Sheets

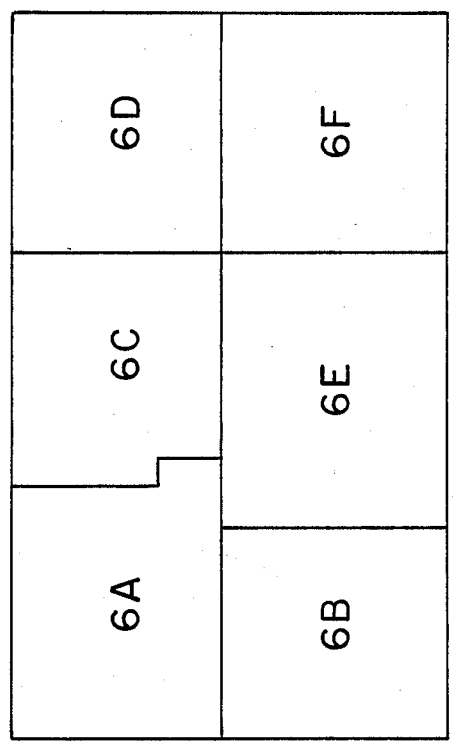
FIG_6
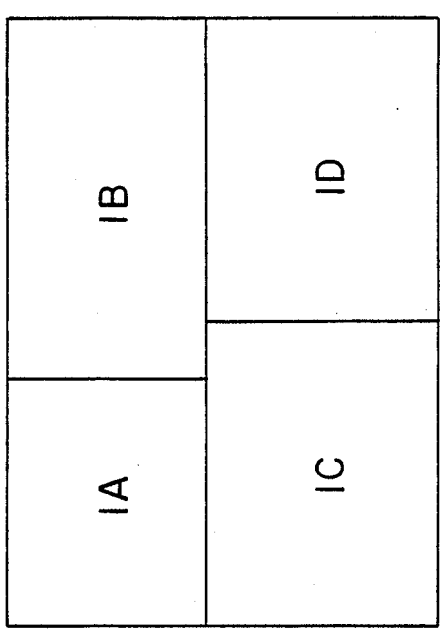
FIG_1
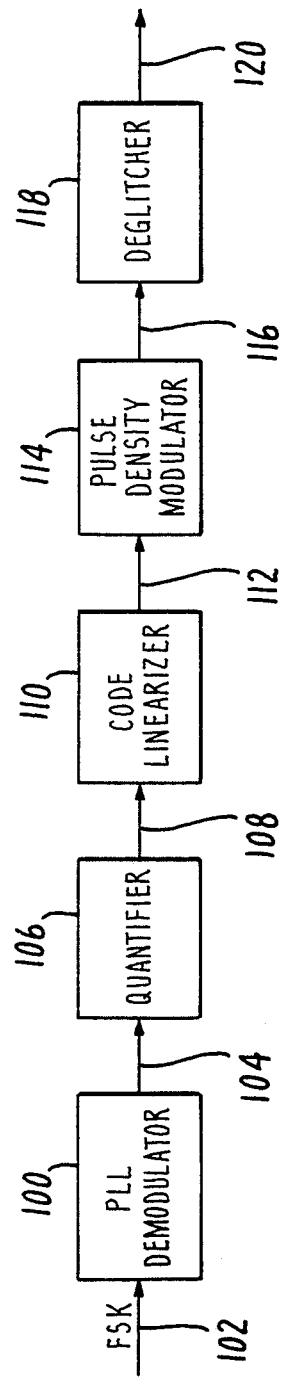
FIG_12

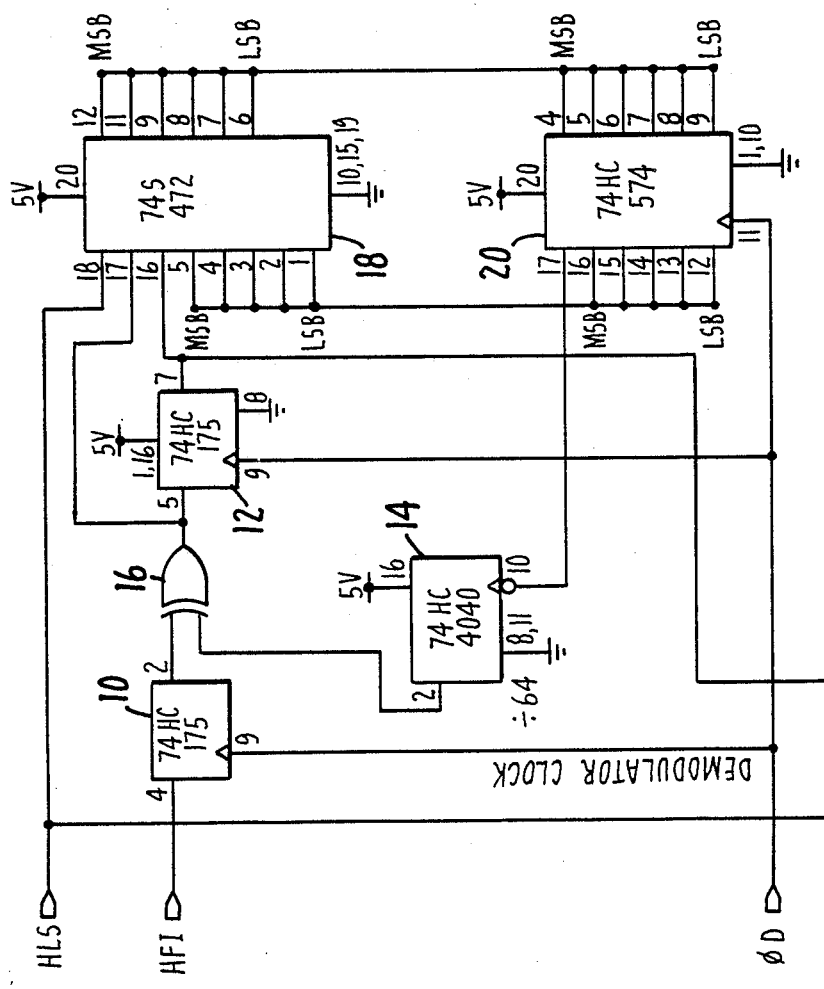
FIG._IA

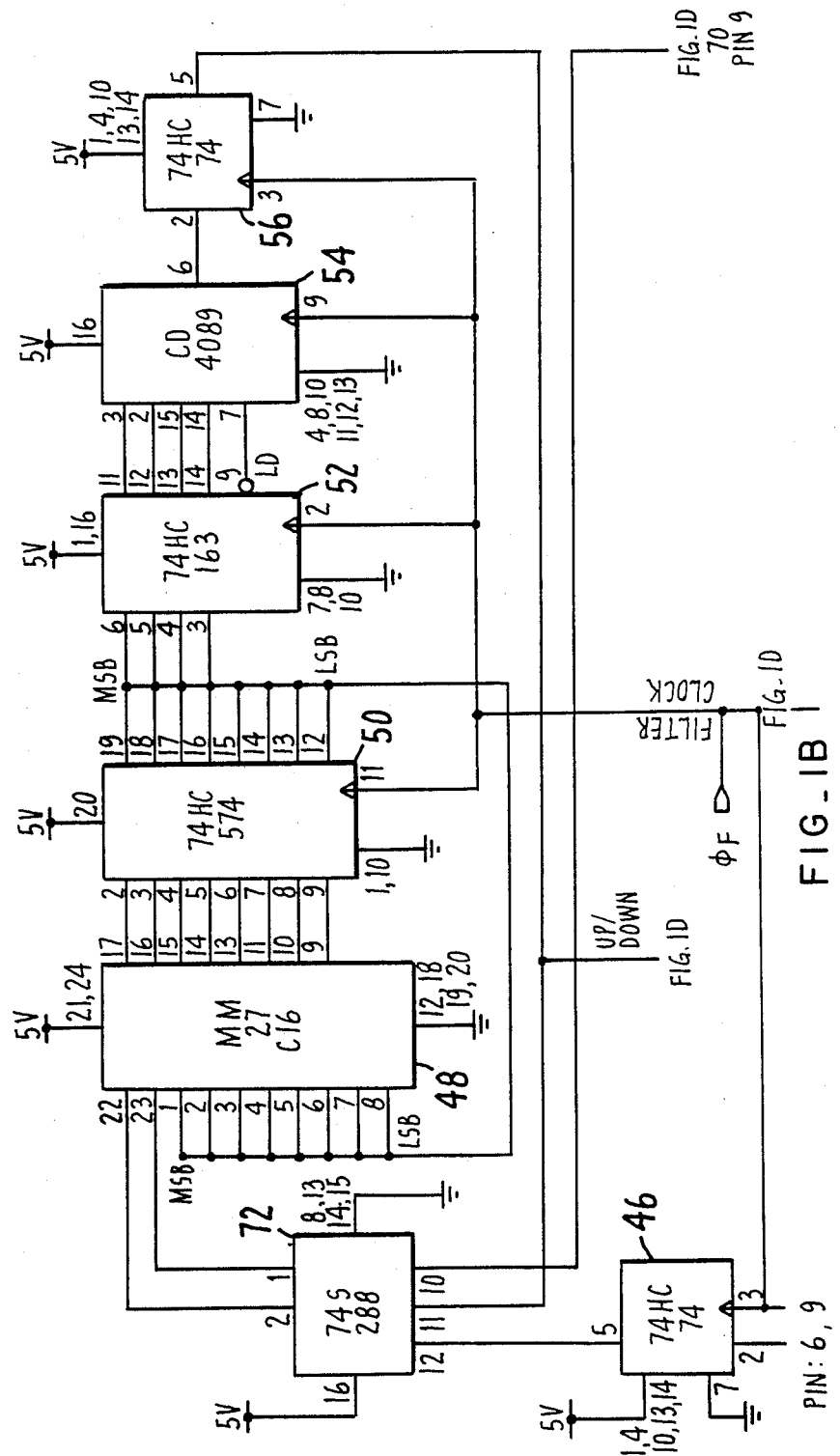

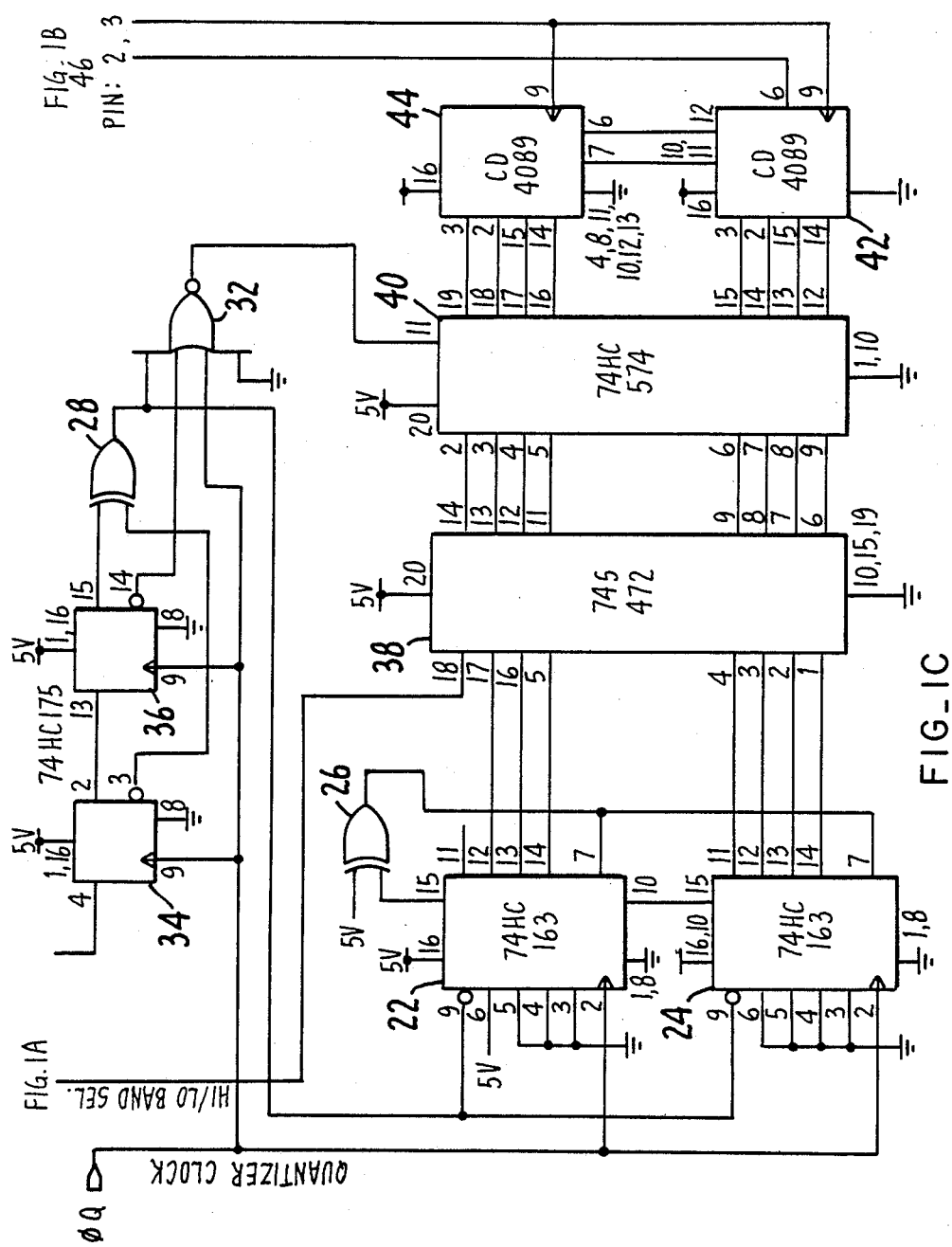

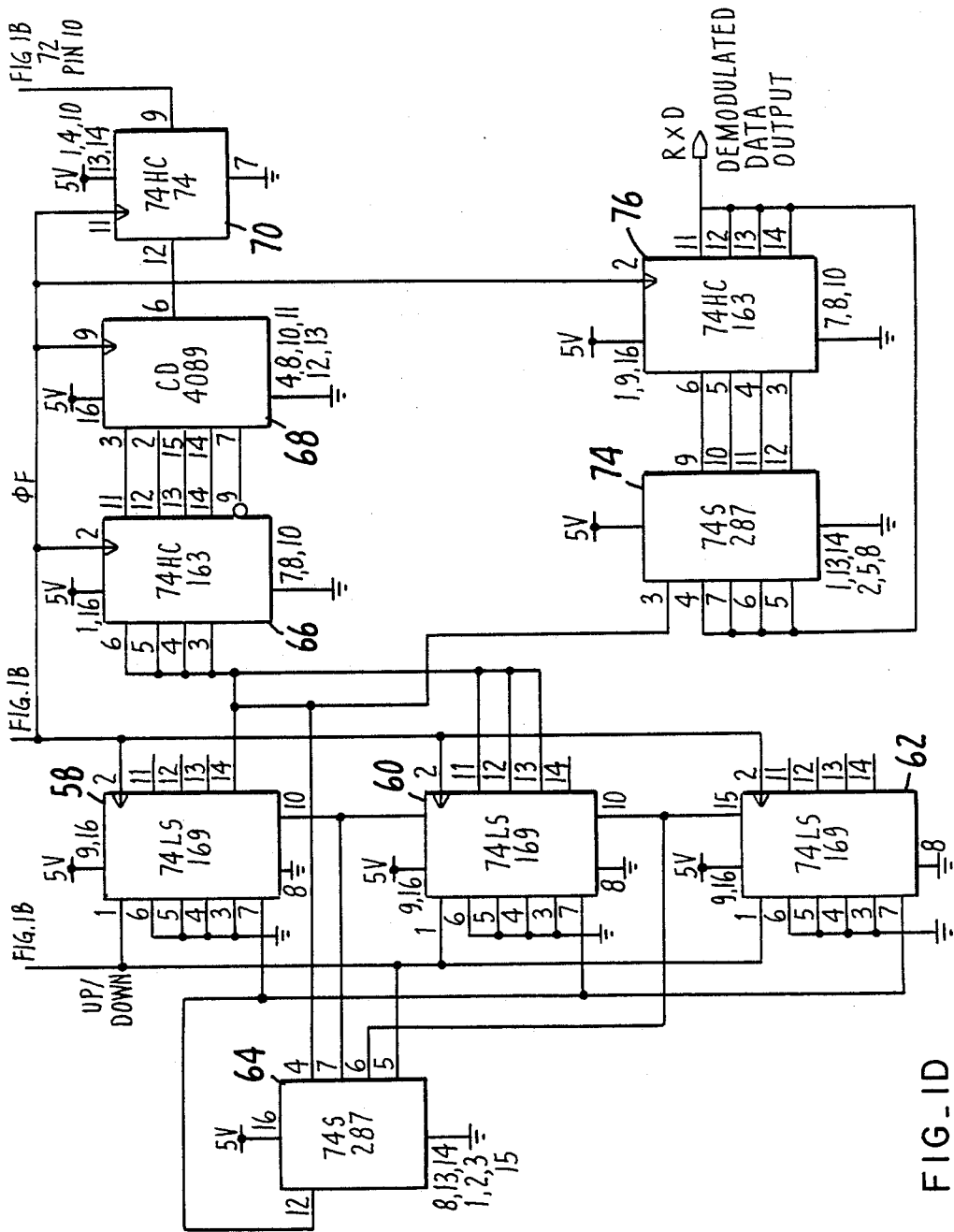

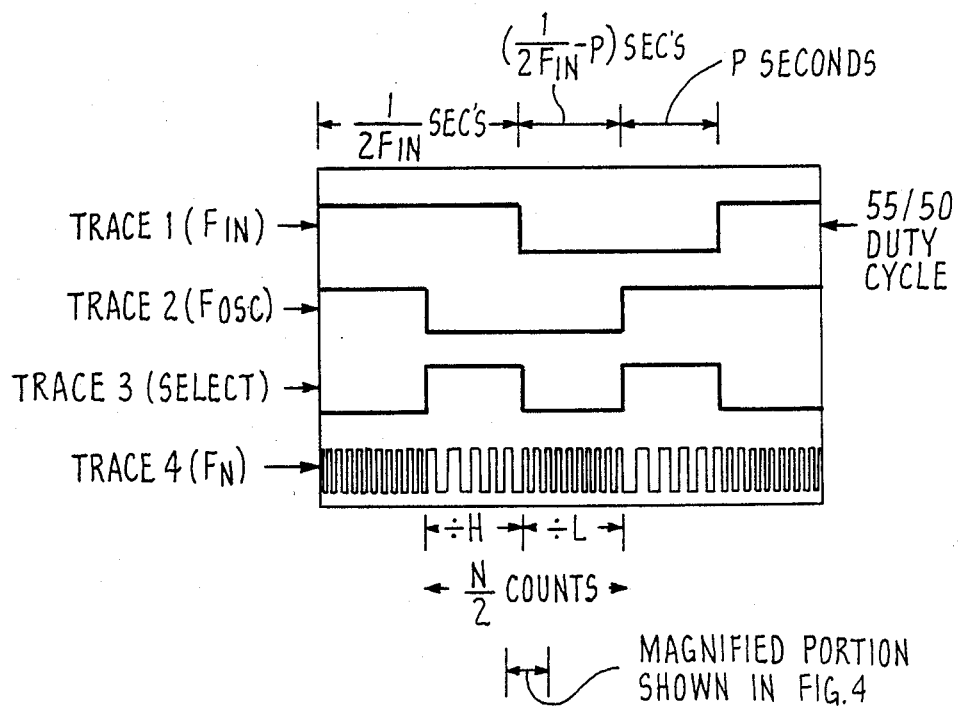
FIG_3
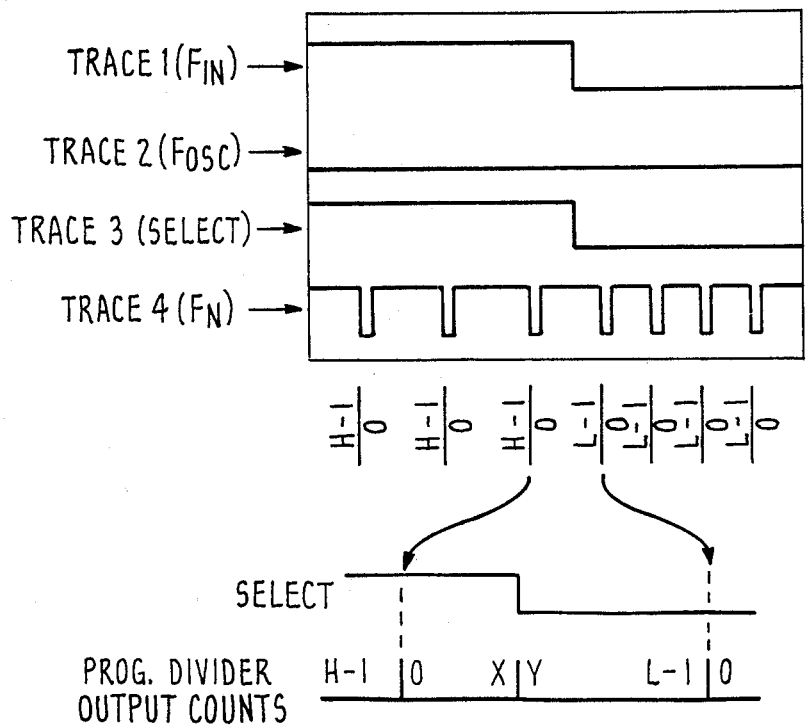
FIG_4

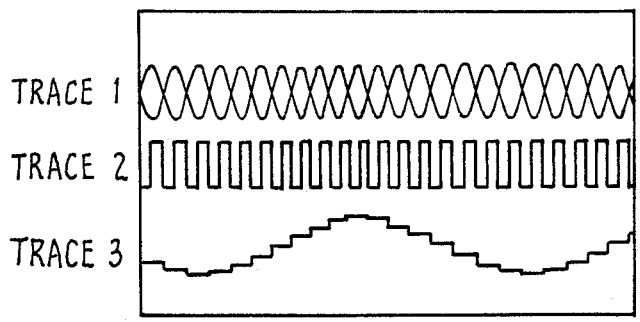
FIG_5
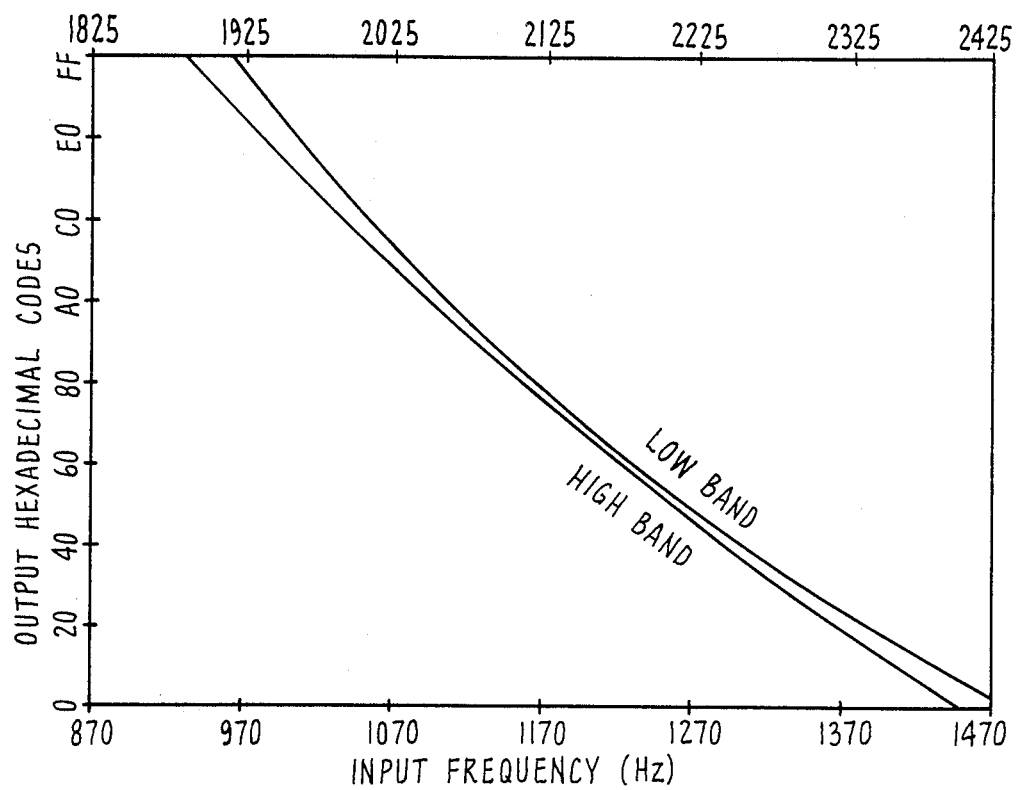
FIG_8

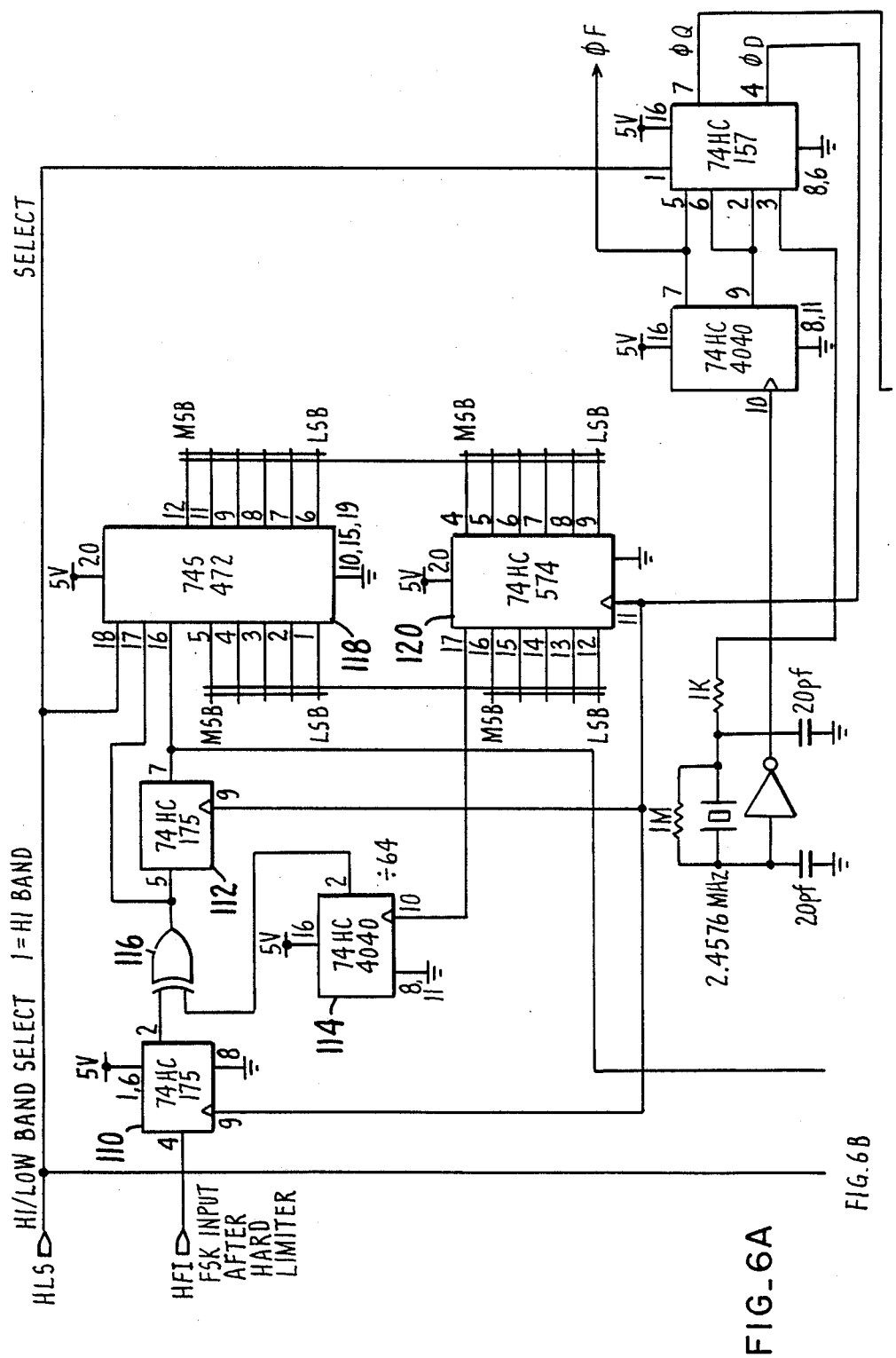

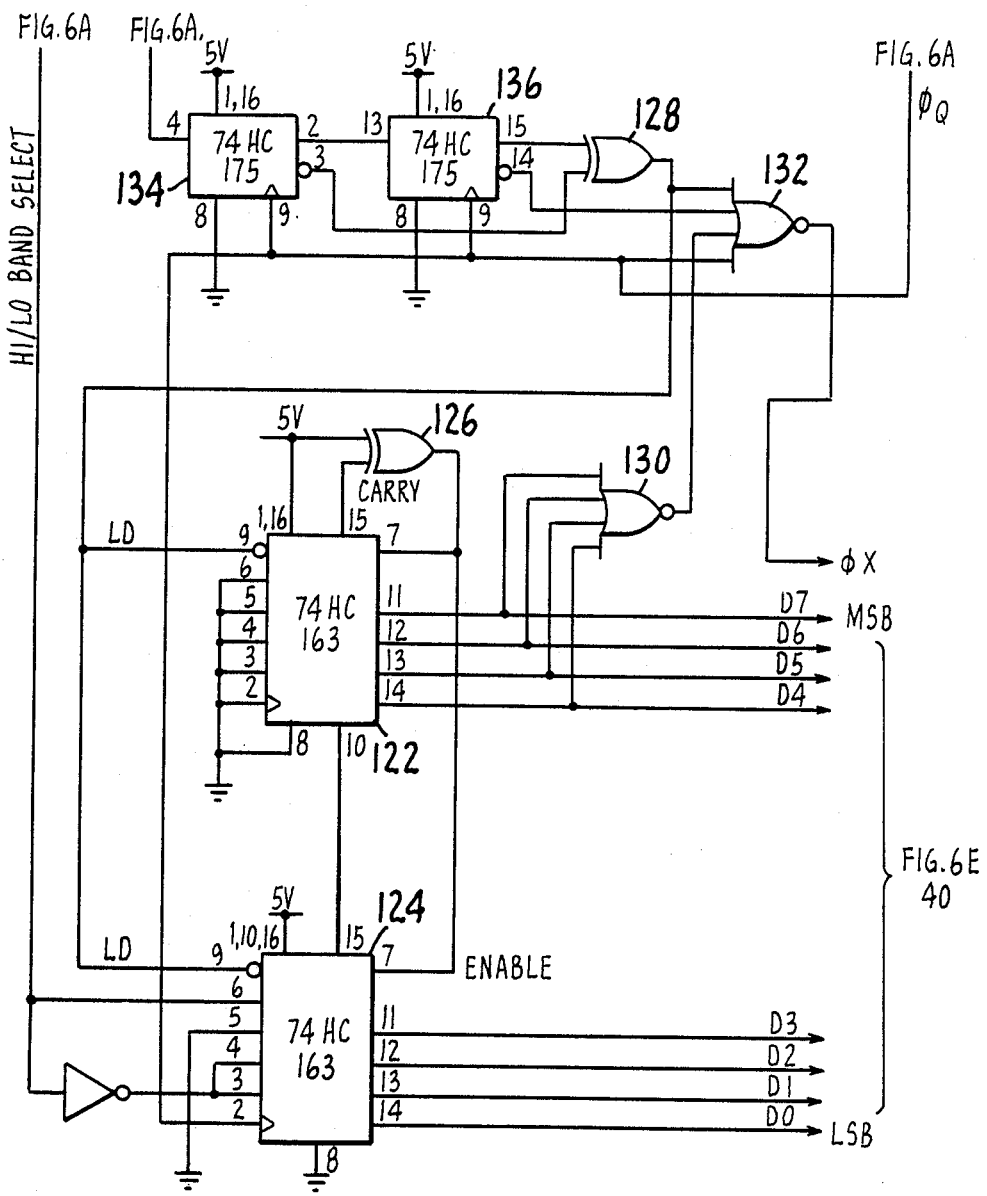
FIG_6B

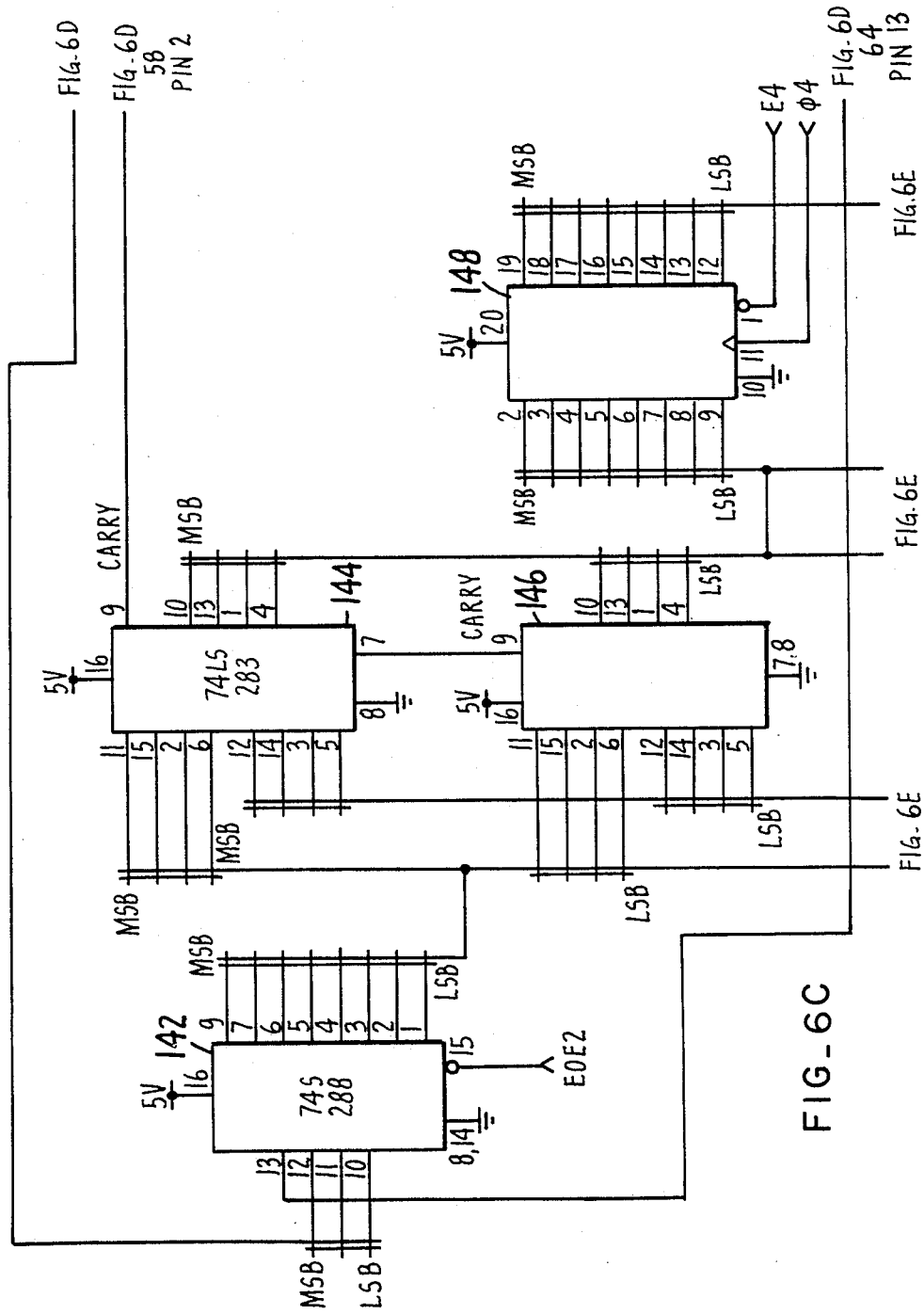
FIG_6C

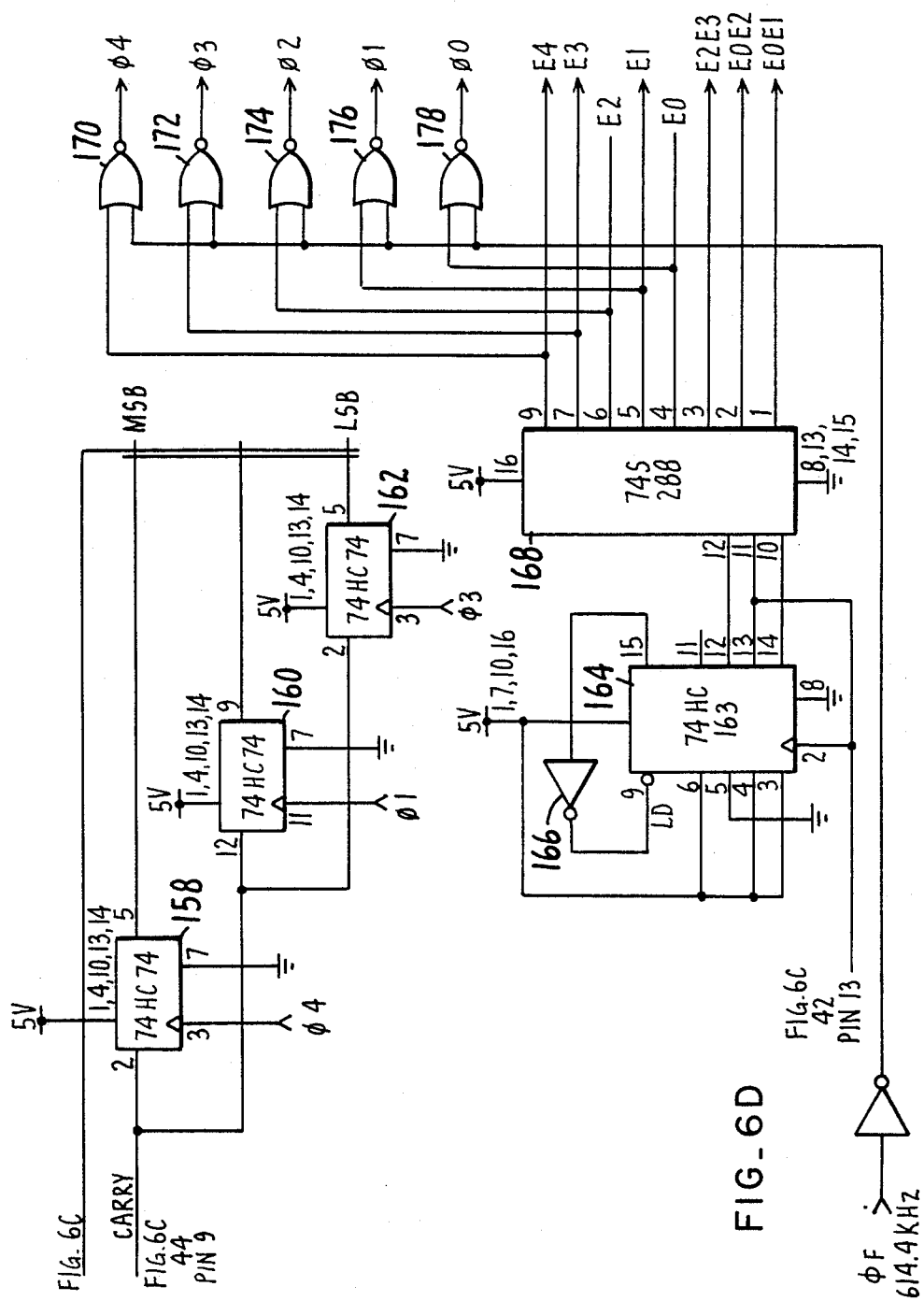
FIG_6D

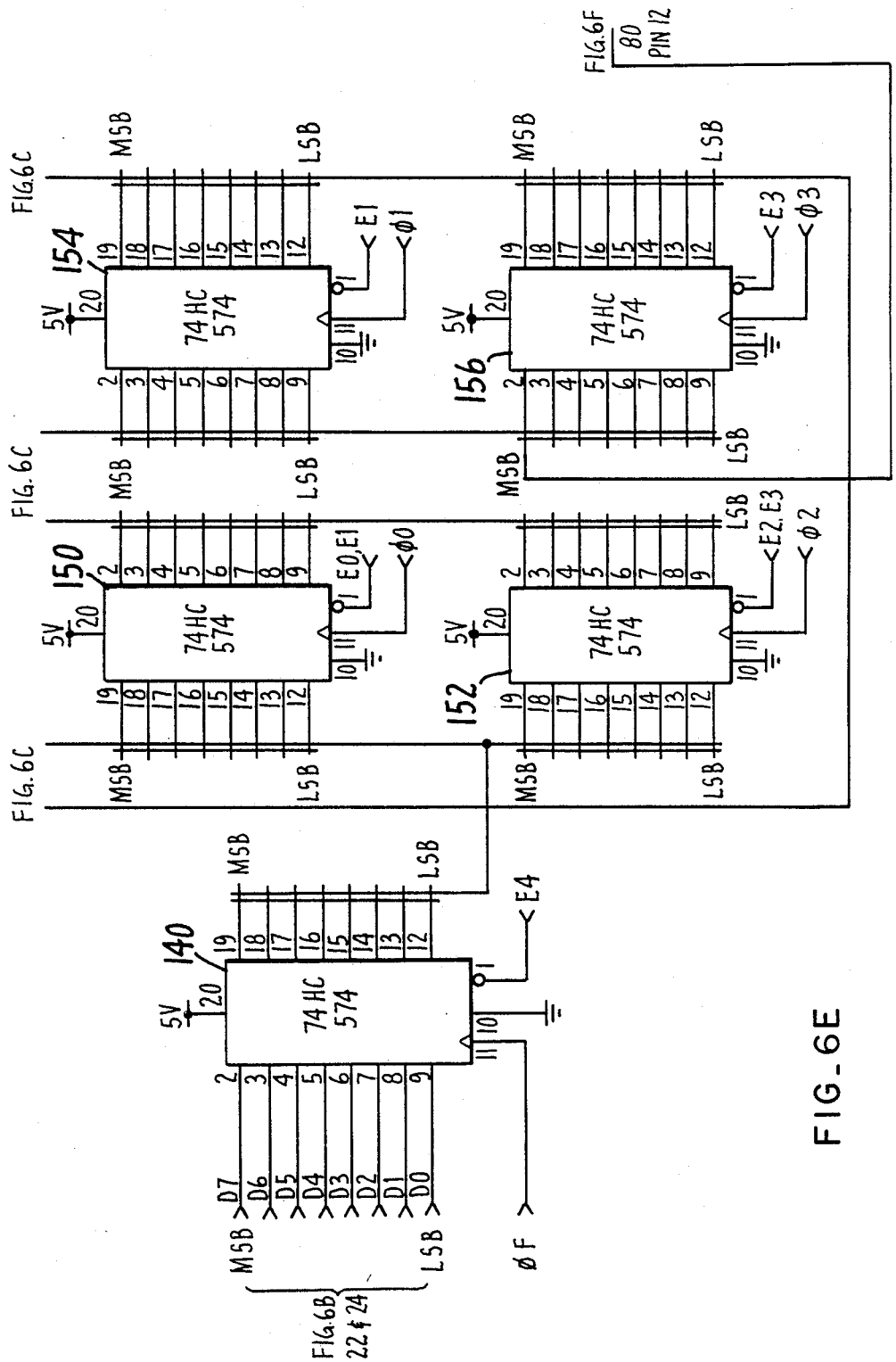
FIG_6E

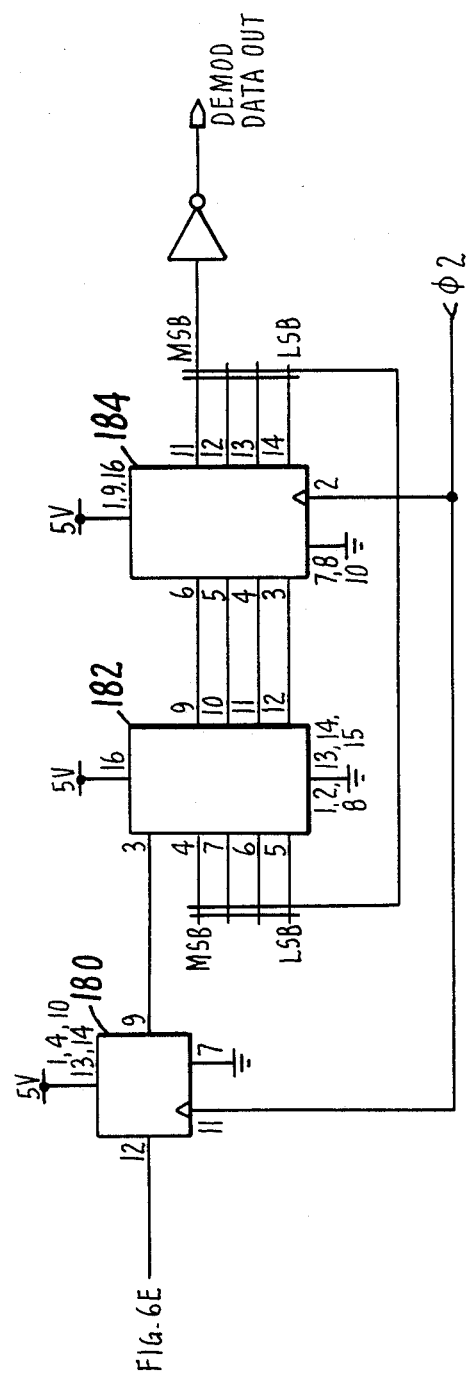
FIG_6F

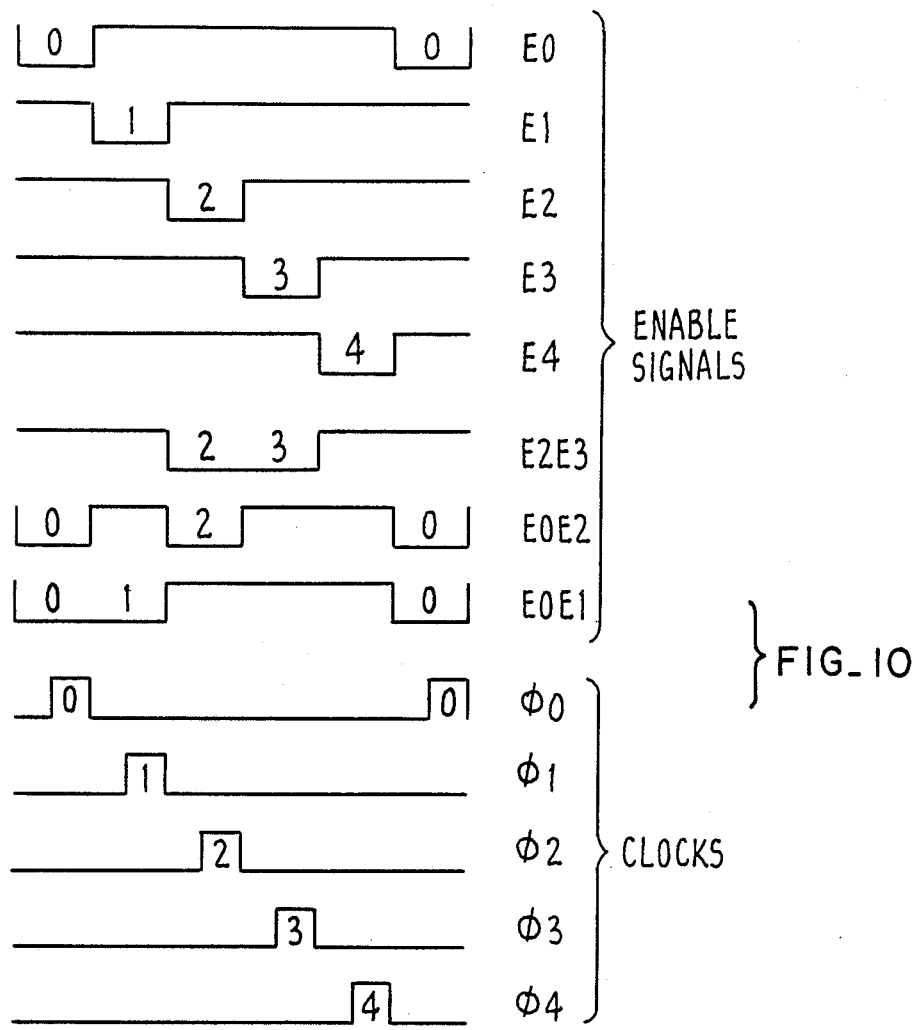
FIG_10
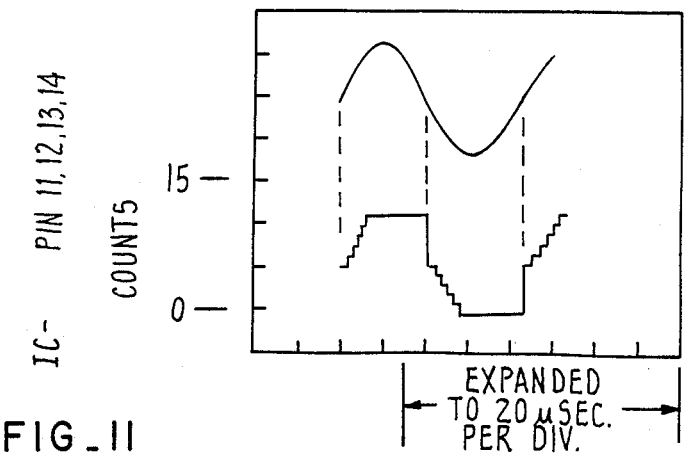
FIG_11

DIGITAL FSK DEMODULATOR

BACKGROUND OF THE INVENTION

1. Field of the Invention

The present invention relates to communications systems and, in particular, to a digital frequency shift keying (FSK) demodulator circuit which receives a hard-limited FSK input signal and recovers the modulating baseband signal at 300 baud or less.

2. Discussion of the Prior Art

The basic function of a communications system is to transmit information over a communication channel between an information source and a destination which are physically separated from one another.

Communications channels designed to handle voice transmissions (i.e., a telephone network) have inherent characteristics which make it difficult for them to transmit digital data or bit streams. Therefore, to permit the transmission of digital data over voice channels, it is necessary to convert the digital data at the transmission point to a form which is compatible with the voice channel. This is done by utilizing the digital data to modulate a carrier waveform which is within the voice frequency range, transmitting the modulated signal and then demodulating the signal at the receiver to separate the transmitted data from the modulated carrier waveform.

Data transmission systems that operate at low data transmission rates, i.e. 1200 baud or less, typically use a modulation technique known as frequency shift keying (FSK). According to this technique, the two binary states are represented by two different frequencies and are detected by using two frequency tuned sections, one tuned to each of the two frequencies. The demodulated signals are then integrated over the duration of a bit and a binary decision is made based upon the result.

Digital transmission using FSK modulation has a number of advantages. First, the implementation is similar in complexity to a conventional AM transmission system. Second, since the received signals can be amplified and limited at the receiver, a simple limiting amplifier can be used, whereas an AM system requires sophisticated automatic gain control in order to operate over a wide level range. Furthermore, FSK modulation can show a 3 or 4 dB improvement over AM systems in most noise environments, particularly at distortion threshold; that is, as the frequency shift becomes greater, the advantage of FSK over AM improves in a noisy environment. A further advantage of FSK modulation is its immunity to the affects of non-selected level variations, even when these variations are extremely rapid. Thus, FSK modulation is used almost exclusively in worldwide high frequency radio transmissions where rapid fades are a common occurrence. In the United States, FSK modulation has nearly universal application for the transmission of data at 1200 baud and below.

A common disadvantage of conventional analog FSK demodulator circuits is that they are sensitive to circuit parameter variations and are not suitable for large scale integration.

Conventional digital FSK demodulator signal processing requires A/D converters, high power consumption and very high system toggling frequencies which results in heavy expenditures on RFI shieldings.

SUMMARY OF THE INVENTION

It is an object of the present invention to provide an all-digital FSK demodulator.

It is an object of the present invention to provide an FSK demodulator which utilizes no A/D converters.

It is an object of the present invention to provide an FSK demodulator circuit which is highly stable and integratable and has no trimming requirements.

It is a further object of the present invention to provide an FSK demodulator circuit which exhibits predictable performance.

It is a further object of the present invention to provide an FSK demodulator circuit that utilizes one system clock that determines center operating frequency.

It is a further object of the present invention to provide a phase locked loop demodulator, rather than the conventional frequency discriminator, to improve error rate performance.

It is yet a further object of the present invention to provide an FSK demodulator circuit which utilizes a code linearizer to improve circuit linearity and to reduce bit-bias distortion.

It is yet a further object of the present invention to provide an FSK demodulator circuit that utilizes pulse density modulation to eliminate the need for multipliers in the filter circuits.

These and other objects of the present invention are accomplished by providing a digital frequency shift keying (FSK) demodulator circuit that conforms to Bell-103 modem specifications. The circuit includes a digital first order phase locked loop and a digital second order low-pass filter. In addition to these two major components, the circuit includes several unique circuit arrangements that allow a total digital implementation which outperforms presently-available FSK demodulators.

Thus, according to the present invention, the FSK input signal is received by a digital phase locked loop demodulator which generates a pulse width modulated output signal. The pulse width of the PWM output is a function of the input signal frequency. The output of the digital PLL demodulator is then provided to a quantizer/translator which transforms the PWM output into corresponding parallel outputs which are representative of the frequency of the FSK input signal. The parallel outputs are processed by a digital filter which emulates a second-order, low-pass filter. The filter processes the parallel outputs utilizing a pulse density modulation (PDM) technique. A deglitcher removes noise from the output of the filter to provide the demodulated data output.

Additional objects, features and advantages of the circuit of the present invention will become apparent and be appreciated by reference to the detailed description of the invention provided below, which should be considered in conjunction with the accompanying drawings.

DESCRIPTION OF THE DRAWINGS

FIG. 1 is a diagram illustrating the proper arrangement of FIGS. 1A–1D.

FIGS. 1A–1D combine to provide a detailed schematic diagram illustrating an embodiment of an FSK demodulator circuit in accordance with the present invention.

FIG. 3 is a timing diagram illustrating the waveform of the circuit model shown in FIG. 2.

FIG. 4 is timing diagram illustrating the algorithm for the synchronous programmable divider with proportional loading which is utilized in the circuit shown in FIGS. 1A-1D.

FIG. 5 is a timing diagram illustrating the waveform of the PLL demodulator of the circuit shown in FIGS. 1A-1D.

FIG. 6 is a diagram illustrating the proper arrangement of FIGS. 6A-6F.

FIGS. 6A-6F combine to provide a schematic diagram illustrating an alternative embodiment of an FSK demodulator circuit in accordance with the present invention.

FIG. 8 is a graph illustrating quantizer output coding versus input frequency.

FIG. 10 is a timing diagram illustrating the waveforms of the clock generator of the circuit shown in FIGS. 6A-6F.

FIG. 11 is a timing diagram illustrating the waveforms of the output deglitcher shown in the FIGS. 6A-6F circuit.

FIG. 12 is a block diagram generally illustrating a digital FSK demodulator in accordance with the present invention.

DETAILED DESCRIPTION OF THE PREFERRED EMBODIMENT

Figures 2, 7:
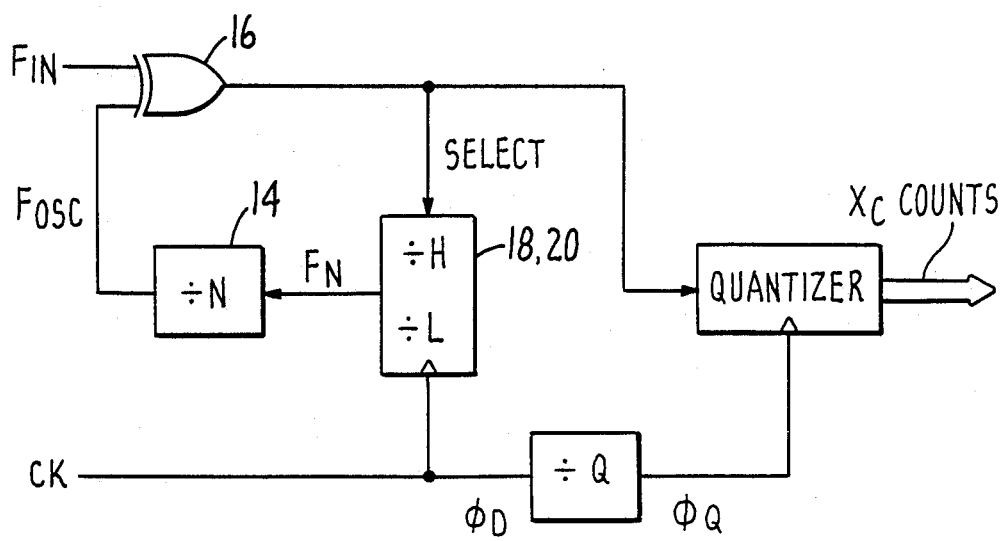
FIG. 2 is a schematic block diagram illustrating a model first-order phase locked loop of the circuit shown in FIGS. 1A-1D.
FIG. 7 is a table which summarizes the clock generator frequency assignments of the circuit shown in FIGS. 6A-6F.

Referring to FIG. 12, the present invention provides a digital FSK demodulator circuit that includes a digital phase locked loop (PLL) demodulator 100 which receives an FSK input signal 102. The PLL demodulator 100 generates a pulse width modulated serial bit stream 104 that corresponds to the input signal 102. A quantizer 106 transforms the serial bit stream 104 into an output signal 108 comprising parallel bits representative of the frequency of the FSK input signal 102. A code linearlizer 110 translates the quantizer output signal 108 into optimized corresponding signals 112, as described in greater detail below. A pulse density modulator 114 operates on the optimized signals 112 to recover the modulating baseband signal 116. A deglitcher 118 removes noise from the signal 116 to provide the demodulated data output 120.

FIGS. 1A-1D combine to provide a detailed schematic diagram of a digital FSK demodulator circuit in accordance with the present invention.

As shown in FIG. 1A, the demodulator circuit receives the following two inputs:
1. HLS High/low band select: 5 volts selects the high-band mode (H=2025 Hz/2225 Hz); 0 volts selects the low-band mode (L=1070 Hz/1270 Hz).
2. HFI FSK signal input: 0-5 volts digital input level. This input is taken from the output of a hard-limiter that is placed after a channel filter. The channel filter and the hard limiter are conventional and, therefore, not described.

The Demodulated Data Output (FIG. 1D) is the only output of the demodulator.

As shown in FIG. 1A, flip-flops 10 and 12 and divide-by module 14 combine with XOR gate 16 and a state machine formed by ROM 18 and "D" flip-flip 20 to form a digital phase locked loop (PLL) demodulator. The function of the PLL demodulator is to generate a pulse-width modulated signal stream such that the width of the positive output pulse of the PLL demodulator is a function of the input frequency.

The modeling of the PLL demodulator can be described with reference to FIGS. 2 and 3.

FIG. 2 provides a simplified block diagram of the PLL demodulator and quantizer portions of the circuit shown in FIGS. 1A-1D. The hard limited FSK input HLS is provided as one input FIN to XOR gate 16. The output of XOR gate 16 is the "Select" input to the state machine 18,20 as well as the input signal to the quantizer stage of the circuit. The output of state machine 18,20 feeds ÷N divider 14 which generates the second input $F_{OSC}$ of XOR gate 16.

FIG. 3 shows the waveforms associated with the FIG. 2 model. Trace 1 in FIG. 3 shows the hard limited FSK input frequency $F_{IN}$ measured at the input of XOR gate 16. Trace 2 shows signal $F_{OSC}$ measured at the output of ÷N divider 14. Trace 3 shows the Select input of state machine 18,20. Trace 4 shows the output $F_N$ of state machine 18,20.

If the FSK input frequency $F_{IN}$ has a 0.5/0.5 duty cycle, then the following equation can be written:

$$\frac{PC_k}{H} + \left(\frac{1}{2F_{IN}} - P\right)\frac{C_k}{L} = \frac{N}{2} \tag{1}$$

therefore, $$F_{IN} = \frac{HC_k}{NHL + 2PC_k(H - L)} Hz \tag{2}$$

or $$P = \frac{HC_k - HLN(F_{IN})}{2C_k F_{IN}(H - L)} \text{ seconds} \tag{3}$$

If the circuit's quantizer (described below) is designed to perform the following equation:

$$X_c = \frac{PC_k}{Q} \text{ counts} \tag{4}$$

then $$F_{IN} = \frac{HC_k}{NHL + 2QX_c(H - L)} Hz \tag{5}$$

or $$X_c = \frac{HC_k - HLN(F_{IN})}{2Q(F_{IN})(H - L)} \text{ counts} \tag{6}$$

thus, $$\text{Lock Range} = \frac{C_k}{N}\left(\frac{1}{L} - \frac{1}{H}\right) Hz \tag{7}$$

$$\text{Equivalent } K_0 K_D = 2x \text{ Lock Range } \frac{1}{\text{Sec}} \tag{8}$$

-continued $$\text{Cutoff Freq}(F - 3dB) = \frac{K_0 K_D}{2\pi} \text{ Hz} \quad (9)$$

Table 1 below provides a summary of circuit performance when the circuit parameters are as follows:

| Lowband: | $C_k$ = 1.2288 MHz |
| | H = 23 |
| | L = 13 |
| Highband: | $C_k$ = 2.4576 MHz |
| | H = 22 |
| | L = 16 |
| Common: | Q = 4 |
| | N = 64 |

TABLE 1

| | HIGH BAND | LOW BAND |
| --- | --- | --- |
| Lock Range | 654.5 Hz | 642.1 Hz |
| $K_0 K_D$ | 1309.1 $\frac{1}{\text{sec}}$ | 1284.3 $\frac{1}{\text{sec}}$ |
| F-3dB | 208.3 Hz | 204.4 Hz |

The input frequency $F_{IN}$ of the input signal HFI and the pulse width period "P" are related by equation (2) above.

The configuration of the above-described PLL demodulator is similar to a circuit proposed by Pasternack & Whalin, "Analysis and Synthesis of a Digital Phase-locked Loop for FM Demodulation". B.S.T.J. vol. 47, page 2207-2239; December 1968. The Pasternack/-Whalin circuit uses two clocks to operate the PLL. The circuit of the present invention uses a synchronous programmable divider with a proportional loading circuit to derive the two clocks. The advantages of this latter approach are:

1. Circuits implemented with integer dividers may not be able to generate the two desired frequencies if the system clock is low, i.e., less than 2 MHz.
2. If the two clocks are generated asynchronously, jitter performance may become unacceptable due to spurious switching. Asynchronous clocking also produces hardware design difficulties in pipeline designs.
3. A programmable divider without the use of proportional loading greatly increases the jitter content in the demodulated output.

Referring back to FIG. 1A, state machine 18,20 is synchronous to the demodulator clock $\phi_D$. The change-over between the two divisors is performed in a proportional manner. The algorithm for implementing the changeover is described in conjunction with FIGS. 3 and 4, where traces 1-4 in FIG. 3 correspond to the signals shown in FIG. 4. The circuit reads the current count "x", then computes $$y = 1 + \frac{x(L-1)}{(H-1)} \quad (10)$$

The circuit then loads "y" counts into state machine 18,20 during the next clock interval.

The pulse width modulated signal stream from the output of XOR gate 16 is pipelined through flip-flop 12 and routed to the quantizer stage, shown in FIG. 1C, formed by counters 22 and 24, XOR gates 26 and 28, flip-flops 34 and 36, and NOR gate 32. The function of the quantizer is to transform the bit stream into parallel outputs so that the quantities can be further processed by the code linearizer, described below. Equation (5) above denotes the relationship between the output counts $X_c$ of the quantizer and the frequency of the input FSK signal $F_{IN}$.

Look-up ROM 38 and latch 40 combine to form a code linearizer. The function of the code linearizer is to translate the parallel numbers from the quantizer to optimized corresponding quantities. This allows the performance of the filter circuit which follows the code linearizer to be optimized. The translating function is a simple look-up process utilizing ROM 38.

The reasons for the look-ups are:

1. Center alignment - the middle count of counters 22 and 24 may not equate to the center frequency of the input frequency band $F_{IN}$. This is due to the fact that some parameters in the PLL demodulator section are integer values, i.e., H, L, N and etc. Exact centering is impossible unless a very high system clock frequency is utilized. This kind of offset introduces bit-bias distortion. The look-up process eliminates the offset.
2. Linearity correction—the transferred characteristic of the PLL demodulator is not linear as demonstrated by equation (5) above. The look-up process corrects this problem.
3. Frequency ratio look-up—the look-up values are expressed in the logarithmic ratio of $F_{IN}$ over the transmitted frequency band's geometric center. This helps to reduce the distortion of the demodulation output and can be treated as part of the linearity correction.
4. Dynamic range amplification—the PLL demodulator is designed to produce the least Inter-Symbol Interference (ISI) distortion at the demodulator output. The band-width (locking range) requirement is about three times the frequency deviation of the FSK signal. In spite of this requirement, the typical output swing produced by the FSK input signal is only ⅓ of the total dynamic range of the PLL demodulator. The look-up process "amplifies" the coding dynamic range so that the filter can operate at an optimum condition.
5. Intentional offset addition—for compensating the intrinsic offset of the filters.

The program listing "FDLR.BAS" to support these statements is provided as Appendix F at the end of this specification.

The architecture of the filter portion of the circuit shown in FIGS. 1A-1D emulates a state variable second-order low-pass filter. In order to reduce the amount of circuitry, the following techniques are introduced:

1. Processing of the signals is done serially by employing a pulse density modulation (PDM) technique.
2. Due to the use of the PDM technique, the summing element becomes a simple look-up table.
3. Due to the use of the PDM technique, the utilization of counters for performing the integrating function becomes feasible.
4. By selecting the length of the counters, a scaling function can be achieved without the use of hardware multipliers.

Referring to FIGS. 1B-C, rate generators 42 and 44 and latch 46 translate parallel outputs from latch 40 into a PDM bit stream. The dynamic range of the output is from −1 to 1, i.e.,

| | |
|---|---|
| "1" | If the output stays at the high level at a high period of time, the weight of the signals is considered to have a value of "1". |
| "−1" | If the output stays at low level from a long period of time, the weight is interpreted as "−1". |
| "0" | A "50% high and 50% low" duty cycle signal denotes a "0" output. |

The instantaneous weight is determined by the running average of the pulse density of the output. Note that the output changes state only at the edges of the filter clock which operates at a very high frequency compared to the modulating base-band signal. The filter circuit after this pulse density modulator is designed to operate with this kind of signal.

Component 72 (FIG. 1B) performs the summing function of the filter. It has three inputs and two outputs. The first input (pin 12) is driven by the demodulated serial signal mentioned above. The second input (pin 11) receives its signal from the filter's first integrator, while the third input (pin 10) is connected to the output of the filter's second integrator. The signals at the last two input pins 11 and 10 have the same kind of modulation as the first input pin 12 and are the same dynamic range, i.e., −1 to 1.

The output of this portion of the circuit is the difference between the input signal and the sum of the outputs of the filters to the integrators. The dynamic range is from −3 to 3 and has the following discrete values: −3, −1, 1, and 3.

Components 48 and 50 form an 8-bit up/down counter and create the filter's first integrator which accumulates the output from summing device 72.

The four most significant bits of the first integrator are fed to a PDM modulator formed by components 52, 54 and 56. The selection of the 4-bit value is based solely on the tradeoff between the amount of hardware and system performance. Since this integrator has more resolution than its output, the intrinsic offset is introduced into the filter circuit. This offset is also due to the asymmetrical characteristic of the rate generator 54; i.e., there is a code "0" for "no" output and no code for a "full" output (the circuit does not produce a full output). Component 52 is a gated four-bit "D" flip-flop which is updated when rate generator 54 is at the terminal count. The connection between pin 7 of rate generator 54 and pin 9 of flip-flop 52 is for the purpose of synchronous loading.

The signal at pin 5 of latch 56 is the output of the first integrator which, as described above, is routed back to summing device 72. This output is also used to increment or decrement the filter's second integrator.

Referring to FIG. 1D, the filter's second integrator is formed by components 58, 60 and 62. In order to achieve a "Bessel" filter characteristic, the length of this counter chain is arranged to have one bit more than the first integrator. The up/down function is controlled by the first integrator. Latch 64 senses all the carry flags from the counter chain and inserts upper and lower limits to the "output swing". Again, only the four most significant bits are used to drive a PDM modulator that feeds the summing circuit 72. This modulator is formed by components 66, 68 and 70.

This filter has a "Bessel" low-pass frequency characteristic; the three dB cutoff frequency is at 155 Hz.

The output signal of the filter block, i.e., pin 14 of counter 58, may contain glitches due to noisy input signals or for other reasons. The glitches normally are of a high frequency nature and scatter around the data transitions. This happens to be a problem common to any FSK demodulator circuit. A deglitcher circuit formed by components 74 and 76 is designed to eliminate this problem by introducing hysteresis.

The deglitcher circuit functions, basically, as a programmable counter such that when the output count crosses the mid-count, the counter will jump to either the maximum or the minimum count.

FIGS. 6A–6D show a preferred embodiment of a digital FSK demodulator circuit in accordance with the present invention. The embodiment shown in FIGS. 6A–6F differs from the embodiment shown in FIGS. 1A–1D as follows:

1. The code linearizer portion of the circuit is omitted in the FIGS. 6A–6F embodiment to reduce system cost. Center alignment and intentional offset addition are achieved by adding a base number to the quantizer. Furthermore, the linearity correction, the frequency ratio look-up and the dynamic range amplification processes are not performed in the FIG. 6A–6F circuit. The degradation and system performance due to the elimination of the linearizer portion of the circuit is compensated by applying a higher clock frequency (two times) to the quantizer portion of the circuit.

2. The clocking signal connected to the demodulator output latch 140 is gated-off in the FIG. 6A–6F circuit when the incoming frequency is above 2360 Hz (high band) or 1430 Hz (low band). These high frequency components are due mainly to noisy edges embedded in the "hard-limited" incoming FSK signal under low input S/N ratio conditions. Due to the presence of these noisy edges, the quantizer portion of the circuit will malfunction and erroneous data will be produced at the output of a latch. Therefore, a 4-input NOR gate 130 is added at the output of counter 122 to perform the "gate-off" function.

3. The second-order low-pass filter portion of the FIGS. 6A–6F circuit is constructed with a multiplexing adder scheme. The processing of signals is also done serially by employing the PDM technique as described in conjunction with the FIGS. 1A–1D circuit. The filter parameters remain unchanged, while the circuit complexity is reduced. A 5-phase clock generator is also implemented for controlling the multiplexing cycles.

The PLL demodulator portion of the circuit shown in FIGS. 6A–6D is the same as the demodulator block shown in the FIGS. 1A–1D embodiment. A program listing "FDPD.SRC", which is provided at the end of the specification as Appendix A, provides the coding statements for the state machine 118, 120 of the demodulator of the FIGS. 6A–6F circuit.

The clock generator frequency assignments for the demodulator clock $\phi_D$, the filter clock $\phi_F$ and the pulse width quantizer clock $Q_Q$ of the FIGS. 6A–6F embodiment are summarized in FIG. 7.

As shown in FIG. 6B, due to the elimination of the code linearizer, the loading circuits of the two counters 122 and 124 are modified to start with a base count before each quantization process. The base count produces offset in the transfer characteristic of the quantizer such that a "center alignment" and an "intentional offset addition" can be achieved. The base count is "8" when the circuit operates in the high band mode and "3" in the low band mode to eliminate bit bias distortion.

To retain the performance of the FIGS. 1A–1D embodiment, the clocking frequency $\phi_Q$ is increased from 614.4 KHz to 1.2288 MHz in the high band mode and from 307.2 KHz to 614.4 KHz in the low band mode. In addition, the counter length is increased from 7 to 8 bits.

The outputs $D_0$–$D_3$ of counter 124 and the outputs $D_4$–$D_7$ of counter 122 are then fed to an 8-bit D-type data latch 140 (FIG. 6E). This latch is clocked at twice the carrier rate, as shown in FIG. 5.

In FIG. 5, Trace 1 shows the input FSK analog waveform measured before the hard limiter in the low band mode at 300 baud. Trace 2 shows the phase detector output measured at the output of XOR gate 116. Trace 3 shows the demodulated output measured at the output of latch 140.

The binary value of the output of latch 140 depicts the frequency reading of the incoming FSK signal. A plot of the transfer characteristic is provided in FIG. 8. It should be noted that the curves are shown in FIG. 8 without the effect of the base counts. The plot follows equation (5) above. The source listing of the plotting program "FQF.SRC" is provided in Appendix B at the end of this specification.

The clock signal to latch 140 may contain noisy edges due to the low S/N ratio at the input of the demodulator. These noisy edges are undesirable because multiple start/stop strobes are generated into the quantizer, thereby causing erroneous data at the output of latch 140. The solution is to gate-off the clock signal applied to latch 140 when the binary value of the counter output is below a specific count. The circuit formed by NOR gate 130 is designed for this purpose. For convenience, the number "16" is selected as the threshold count. As shown in FIG. 8, the corresponding frequency readings are 2360 Hz for the high band mode and 1430 Hz for the low band mode. These frequencies are beyond the maximum deviation of the incoming FSK signal frequency $F_{IN}$.

Referring to FIGS. 6C–6E, a second-order, low-pass filter is formed by data latch 140, ROM decoder 142, 8-bit bit adder 144 and 146, data latches 148, 150, 152, 154 and 156 and a demultiplexing circuit formed by flip-flops 158, 160 and 162.

The architecture of this filter emulates a second order "state variable" type of low-pass filter. It includes two integrator latches 150 and 152 in the feed-back loop. The −3 dB cut-off frequency is at 155 Hz with a Bessel type of roll-off characteristic (including the pole introduced by the PLL Demodulator).

An 8-bit adder 144 and 146 is the core of the filter circuit. It is multiplexed to perform five functions within a period of 8.138 μSec (1/122.88 KHz). Each function occupies a cycle which is 1/5 (1.628 μSec) of the total period. The cycle timing is arbitrated by a five-phase clock generator described below. The five function-cycles are as follows:

Cycle 0: to perform the 1st integrating function;
Cycle 1: to convert the 1st integrator parallel output data to a (PDM) signal;
Cycle 2: to perform the 2nd integrating function;
Cycle 3: to convert the 2nd integrator parallel output data to a PDM signal;
Cycle 4: to convert the demodulated parallel output data from latch 140 to a PDM signal.

The five function-cycles can be divided into two types of cycles, the integrating cycles and the PDM conversion cycles.

The integrating cycle is a straightforward process. The result generated in each integrating cycle is the algebraic sum of the previous contents of the corresponding integrator and the PDM signal(s).

Cycle 0: The 1st Integrator cycle

Latch 150 is enabled during this cycle. The previous contents stored in its output registers are applied to one set of inputs of the adder circuit. The other set of inputs of the adder circuit are connected to the PDM outputs via ROM decoder 142. The PDM signals are categorized as follows:

Pin 5 of flip-flip 158—demodulated PDM signal
Pin 9 of flip-flop 160—1st integrator PDM output
Pin 5 of flip-flop 162—2nd integrator PDM output During this cycle, the output of decoder 142 sums these three signals as described on line #240 of the program listing "FADR.SRC" which is provided in Appendix C at the end of this specification. The result has one of the following values:

$$+2, -2, +6, -6$$

To achieve a 7-bit equivalent adder circuit out of an 8-bit configuration, a scaling multiplier of "2x" is utilized.

Cycle 2: the 2nd Integrator cycle

This cycle is similar to Cycle 0. Integrator 152 is enabled and serves as the storage element. The output of decoder 142 only decides the value of the PDM signal of the 1st integrator, which has only two discrete values, +1 and −1. The selection between Cycle 0 or Cycle 2 in the decoder circuit is controlled by the signal applied to pin 13 of decoder 142.

The PDM conversion cycles are achieved by means of an "adding" technique. The result is promising due to the fact that the adder circuit accumulates every signal parallel input data in its registers until overflow. Upon overflow, an amount equal to the carry weighting is subtracted from the accumulator (no data is being lost). On the other hand, conventional rate-multipliers (such as the CD4089 rate-multiplier) perform a one-to-one translation on the input codes; the memory function relies on the counter states inside the multiplier for waveform continuity. For input signals that change more rapidly than the repetition rate of the internal counter, the output of the multiplier cannot accurately reproduce the input signal, thereby resulting in spurious distortion.

The "adder" approach basically performs a Sigma-Delta modulator function. The adder accumulates the input data until overflow. Upon overflow, an amount equal to the carry weighting is subtracted from the accumulator (the adder's basic function) and a logical "1" is generated at the carry output. The carry output then serves as the PDM output.

Cycle 4: the conversion cycle for the incoming data

The input data is fed to inputs of latch 140 while the storage element is latch 148.

Cycle 1: the conversion cycle for the 1st integrator

Latch 150 is the input port, latch 154 is the storage element.

Cycle 3: the conversion cycle for the 2nd integrator

Latch 152 is the input port; latch 156 is the storage element.

The PDM output signals generated in these cycles are multiplexed at the carry pin, i.e., pin 9, of adder 144. The demultiplexing circuit 158, 160, 162 is included to retrieve the signals.

There are several distinct properties of this kind of filter:

1. The input signal to the filter can be either in PDM format or in parallel data format.

2. The PDM output signal or parallel output data are available simultaneously from the filter.

3. In the event of a parallel-in and parallel-out configuration, the output data is oversampled compared to the input data. The interpolating characteristic implies that the filter output is almost free from the sampling alias frequencies (sampling frequency > > base band signal). In this application, the filter input is sampled at twice the carrier rate, i.e., about 2 to 4 KHz, while the output sampling rate is 614.4 KHz. This can be seen in the series of waveforms provided in FIG. 9 wherein the input signal is a 300 baud FSK data sequence and waveforms "A" illustrate the demodulator output with an 8-bit DAC included and waveforms "B" illustrate the filter output with an 8-bit DAC/latch included.

In spite of these properties, a variety of circuits, such as sine-wave generators, modulators, etc., can be built without the use of digital-to-analog converters (use PDM output) or continuous anti-alias filters (parallel outputs).

As shown in FIG. 6D, the five filter cycles are arbitrated by a filter clock generator consisting of divide-by module 164, invertor 166, ROM decoder 168 and NOR gates 170, 172, 174, 176 and 178. Divide-by module 164 divides the input clocking frequency (614.4 KHz) by 5 and its outputs are fed to ROM decoder 168. The outputs from decoder 168 consist of five enable signals, E0–E4, and three combined enable signals, E2E3, E0E2, and E0E1. The five enable signals E0–E4 are also used for generating the five phase clocking signals $\phi_0$–$\phi_4$. The timing relationship is shown in FIG. 10. The program listing "FCLK.SRC", provided in Appendix D at the end of this specification, provides the coding statement for ROM decoder 168.

As shown in FIG. 6F, D-type flip-flop 180 is used to latch the most significant bit of the parallel output data from the filter circuit during Cycle 2 (the 2nd integrating cycle). The output of this flip-flop 180 is then used to drive an output deglitcher circuit formed by programmable counter 182 and flip-flop 184.

The output signal from the filter may contain glitches due to noisy input signals or other reasons. The glitches normally are of high frequency nature and scatter around the data transitions. This is a problem common to any demodulator circuit. The output deglitcher formed by programmable counter 182 and flip-flop 184 is designed to eliminate this problem by introducing hysteresis.

As illustrated in FIG. 11, the output deglitcher basically functions as a programmable counter such that when the output count crosses the mid-count, the counter will jump to either the maximum (15) or the minimum (0) count. Note that the threshold does not change (mid-count is a fixed number) and hysteresis is achieved by changing the state of the counter. The performance of this deglitcher has been found to be better than conventional Schmitt trigger circuits as far as Intersymbol Interference (ISI) output jitter is concerned. The coding algorithm for counter 182 is provided in Appendix D.

The output of the deglitcher circuit is available at pin 11 of flip-flop 184. An invertor 186 is added to provide the proper polarity at the demodulator output.

Conventional commercially-available demodulators 5–20% jitter readings.

When all bit jitter components are allowed to interact, under no external noise conditions, the circuit shown in FIGS. 6A–6F produces 2% and 3% jitter readings in the high-band mode and the low-band mode, respectively, with negligible bit bias distortion.

Figure 9:
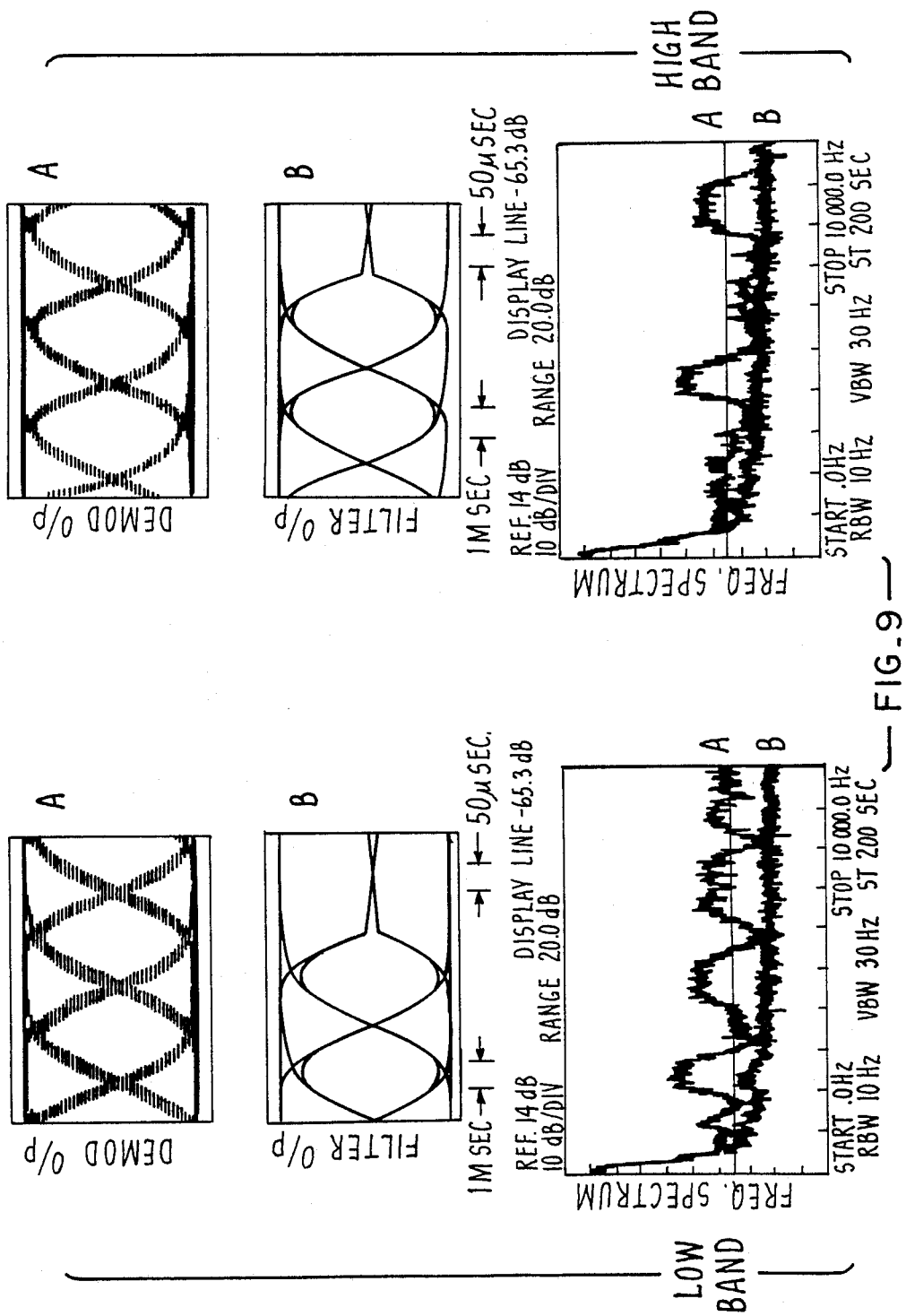
FIG. 9 provides a series of waveforms illustrating the performance of the baseband filter of the demodulator circuit shown in FIGS. 6A-6F.

The filter performance and the eye-diagrams are shown in FIG. 9. The eye-diagram for the low-band mode shows unsymmetrical excursion on the two peaks; this is due to the absence of a "linearizer" circuit, which is excluded from the FIG. 1A–1D embodiment because of cost considerations. The spectrum measurement indicates the noise floor is almost 60 dB below the signal main peak, which is more than adequate for this kind of application.

It should be understood that various alternatives to the embodiments of the invention described herein may be employed in practicing the invention. It is intended that the following claims define the invention and that circuits within the scope of these claims and their equivalents be covered thereby.

```
10    ! FDPD.SRC         April 84
20    ! FSK_demodulator, Programmable divider
30    MASS STORAGE IS "103_DEM1:CS80,7"
40    OPTION BASE 0
50    DOUBLE If(127),Output(255),Addr,Op,H1,Eod,X,Tg,H,L,Ov,Dmsk
60    MAT If=(0)
70    If(0)=8
80    If(1)=6
90    File$="FDPD.DATA"
100   !
110   PRINT PAGE
120   FOR Addr=0 TO 255
130     Mask_bits(Addr,"10000000",H1)
140     Mask_bits(Addr,"01100000",Eod)
150     Mask_bits(Addr,"00011111",X)
160   !
170   Tg=1
```

```
180     IF X=0 THEN Tg=0
190     IF H1=0 THEN
200        H=23
210        L=13
220     ELSE
230        H=22
240        L=16
250     END IF
260     SELECT Eod
270     CASE 0
280        Ov=L
290        Op=X+1
300     CASE 1
310        Ov=L
320        Op=1+(X*(L-1)/(H-1))
330     CASE 2
340        Ov=H
350        Op=X+1
360     CASE 3
370        Ov=H
380        Op=X+1
390     END SELECT
400     IF Op>=Ov THEN Op=0
410     IF (X+1)>H THEN
420        Dmsk=DSHIFT(15,-16)
430     ELSE
440        Dmsk=0
450     END IF
460     Op=BINIOR(BINIOR(DSHIFT(Tg,-5),Op),Dmsk)
470     !
480     Print_hex(Addr,4,""," ",";")
490     Print_hex(Op,8,"","",".")
500     Output(Addr)=Op
510   NEXT Addr
520   Write_data_file(File$,If(*),Output(*))
530 END
>>>>>> SUB Write_data_file(File$,DOUBLE Inf(*),Outdata(*))
>>>>>> SUB Read_data_file(File$,DOUBLE Inf(*),Indata(*))
>>>>>> SUB Beep_ok
>>>>>> SUB Beep_not_ok
>>>>>> SUB Beep_tick
>>>>>> SUB Prt_on
>>>>>> SUB Prt_off
>>>>>> SUB Display_func
>>>>>> SUB Set_screens
>>>>>> SUB Mask_bits(DOUBLE Addr,M$,DOUBLE X)
>>>>>> SUB Print_hex(DOUBLE X,Length,X$,Y$,Z$)
>>>>>> SUB Print_bin(DOUBLE X,Length,X$,Y$,Z$)
>>>>>> SUB Convert_hex(DOUBLE X,Length,Hex$)
>>>>>> SUB Convert_bin(DOUBLE X,Length,Bin$)
>>>>>> SUB Dbl_string(DOUBLE X,X$)
>>>>>> SUB Print_string(DOUBLE Xc,Yc,X$)
>>>>>> SUB Get_key(P$,X$)
>>>>>> SUB Get_item(DOUBLE Xc,Yc,Cur,X$,P$,C$)
>>>>>> SUB Edit_string(P$,X$,DOUBLE Cursor,Ins,Str,Stp)
>>>>>> SUB Gpinit
>>>>>> SUB Graphics_pause
>>>>>> SUB Grid(D$,REAL A,B,DOUBLE Line,Clor,OPTIONAL REAL X0,X1,X2,X3,X4)
>>>>>> SUB Ltext(L$,REAL X,Y,Dir,Csize,Aratio)
```

**Hex Dump of file = 103=DEM1/FDPD:DATA - 256*6 - (low byte)**

```
Addr   0  1  2  3  4  5  6  7   8  9  A  B  C  D  E  F
0000  01 22 23 24 25 26 27 28  29 2A 2B 2C 20 20 20 20   ."#$%&'()*+,
0010  20 20 20 20 20 20 20 20  20 20 20 20 20 20 20 20
0020  01 22 22 23 23 24 24 25  25 26 26 27 28 28 29 29   ."""##$$%%&&'(()
0030  2A 2A 2B 2B 2C 2C 20 20  20 20 20 20 20 20 20 20   **++,,
0040  01 22 23 24 25 26 27 28  29 2A 2B 2C 2D 2E 2F 30   ."#$%&'()*+,-./0
0050  31 32 33 34 35 36 20 20  20 20 20 20 20 20 20 20   123456
0060  01 22 23 24 25 26 27 28  29 2A 2B 2C 2D 2E 2F 30   ."#$%&'()*+,-./0
0070  31 32 33 34 35 36 20 20  20 20 20 20 20 20 20 20   123456
0080  01 22 23 24 25 26 27 28  29 2A 2B 2C 2D 2E 2F 20   ."#$%&'()*+,-./
0090  20 20 20 20 20 20 20 20  20 20 20 20 20 20 20 20
00A0  01 22 22 23 24 25 25 26  27 27 28 29 2A 2A 2B 2C   ."""#$%%&''()**+,
00B0  2C 2D 2E 2F 2F 20 20 20  20 20 20 20 20 20 20 20   ,-.//
00C0  01 22 23 24 25 26 27 28  29 2A 2B 2C 2D 2E 2F 30   ."#$%&'()*+,-./0
00D0  31 32 33 34 35 20 20 20  20 20 20 20 20 20 20 20   12345
00E0  01 22 23 24 25 26 27 28  29 2A 2B 2C 2D 2E 2F 30   ."#$%&'()*+,-./0
00F0  31 32 33 34 35 20 20 20  20 20 20 20 20 20 20 20   12345
Ending address = 00FF
```

**Hex Dump of file = 103=DEM1/FDPD:DATA - 256*6 - (d'care mask - low byte)**

```
Addr   0  1  2  3  4  5  6  7   8  9  A  B  C  D  E  F
0000  00 00 00 00 00 00 00 00  00 00 00 00 00 00 00 00   ................
0010  00 00 00 00 00 00 00 0F  0F 0F 0F 0F 0F 0F 0F 0F   ................
0020  00 00 00 00 00 00 00 00  00 00 00 00 00 00 00 00   ................
0030  00 00 00 00 00 00 00 0F  0F 0F 0F 0F 0F 0F 0F 0F   ................
0040  00 00 00 00 00 00 00 00  00 00 00 00 00 00 00 00   ................
0050  00 00 00 00 00 00 00 0F  0F 0F 0F 0F 0F 0F 0F 0F   ................
0060  00 00 00 00 00 00 00 00  00 00 00 00 00 00 00 00   ................
0070  00 00 00 00 00 00 00 0F  0F 0F 0F 0F 0F 0F 0F 0F   ................
0080  00 00 00 00 00 00 00 00  00 00 00 00 00 00 00 00   ................
0090  00 00 00 00 00 00 0F 0F  0F 0F 0F 0F 0F 0F 0F 0F   ................
00A0  00 00 00 00 00 00 00 00  00 00 00 00 00 00 00 00   ................
00B0  00 00 00 00 00 00 0F 0F  0F 0F 0F 0F 0F 0F 0F 0F   ................
00C0  00 00 00 00 00 00 00 00  00 00 00 00 00 00 00 00   ................
00D0  00 00 00 00 00 00 0F 0F  0F 0F 0F 0F 0F 0F 0F 0F   ................
00E0  00 00 00 00 00 00 00 00  00 00 00 00 00 00 00 00   ................
00F0  00 00 00 00 00 00 0F 0F  0F 0F 0F 0F 0F 0F 0F 0F   ................
Ending address = 00FF
```

**Hex Dump of file = 103=DEM1/FDPD:PLA - 256*6 - (low byte)**

```
Addr   0  1  2  3  4  5  6  7   8  9  A  B  C  D  E  F
0000  01 22 23 24 25 26 27 28  29 2A 2B 2C 20 20 20 20   ."#$%&'()*+,
0010  20 20 20 20 20 20 20 28  28 28 29 28 20 20 20 20         (((()(
0020  01 22 22 23 23 24 24 25  25 26 26 27 28 28 29 29   ."""##$$%%&&'(()
0030  2A 2A 2B 2B 2C 2C 20 24  2E 2E 2B 2F 28 28 28 28   **++,, $..+/((((
0040  01 22 23 24 25 26 27 28  29 2A 2B 2C 2D 2E 2F 30   ."#$%&'()*+,-./0
0050  31 32 33 34 35 36 20 28  29 2A 2B 2C 2D 2E 28 20   123456 ()*+,-.(
0060  01 22 23 24 25 26 27 28  29 2A 2B 2C 2D 2E 2F 30   ."#$%&'()*+,-./0
0070  31 32 33 34 35 36 20 28  29 2A 2B 2C 2D 2E 28 20   123456 ()*+,-.(
0080  01 22 23 24 25 26 27 28  29 2A 2B 2C 2D 2E 2F 20   ."#$%&'()*+,-./
0090  20 20 20 20 20 20 20 28  28 28 28 28 28 28 28 20         ((((((((
00A0  01 22 22 23 24 25 25 26  27 27 28 29 2A 2A 2B 2C   ."""#$%%&''()**+,
00B0  2C 2D 2E 2F 2F 20 24 20  2C 2D 28 29 2A 28 2A 28   ,-.// $ ,-()*(*(
00C0  01 22 23 24 25 26 27 28  29 2A 2B 2C 2D 2E 2F 30   ."#$%&'()*+,-./0
00D0  31 32 33 34 35 20 26 28  29 2A 2B 2C 2D 28 2E 20   12345 &()*+,-(.
00E0  01 22 23 24 25 26 27 28  29 2A 2B 2C 2D 2E 2F 30   ."#$%&'()*+,-./0
00F0  31 32 33 34 35 20 26 28  29 2A 2B 2C 2D 28 2E 20   12345 &()*+,-(.
Ending address = 00FF
```

APPENDIX B

```
10   ! FQF.SRC     JAN 85
20   ! FSK_demodulator, Quantizer output vs input frequency
30   OPTION BASE 0
40   COM Attr$(7)[4],Clor$(7)[4]
50   COM Crlf$[2],Strlne$[2],Clrlne$[2]
60   COM DOUBLE Plotter,Solid,Dot,Dash
70   COM DOUBLE White,Red,Yellow,Green,Cyan,Blue,Magenta
80   REAL Xstrt,Xstp,Ystrt,Ystp,Xcor,Ycor,Xd,Yd
90   DIM X$[80]
100  Plotter=0
110  Display_func
120  DOUBLE If(127),H,L,N,Q,Xc,Mc
130  REAL Ck,Freq(512),Frq,Fmin,Fmax
140  !
150  H=23
160  L=13
170  N=64
180  Ck=1228800
190  Q=2
200  GOSUB Calc
210  !
220  H=22
230  L=16
240  N=64
250  Ck=2457600
260  Q=2
270  GOSUB Calc
280  END
290  !
300  Calc:  !
310  PRINT PAGE
320  Fmin=9999999
330  Fmax=0
340  FOR Xc=0 TO 255
350     Frq=(H*Ck)/((H*L*N)+(2*Q*Xc*(H-L)))
360     IF Fmin>Frq THEN Fmin=Frq
370     IF Fmax<Frq THEN Fmax=Frq
380     Freq(Xc)=Frq
390     PRINT USING "3D,3X,4D.2D";Xc,Frq
400  NEXT Xc
410  PRINT "Fmin=";Fmin
420  PRINT "Fmax=";Fmax
430  GOSUB Plot_xfer
440  RETURN
450  !
460  !
470  Plot_xfer:  !
480  IF Ck=1228800 THEN
490     Xstrt=14
500     Xstp=122
510     Ystrt=10
520     Ystp=86.8
530     Gpinit
540     FRAME
550     PEN Magenta
560     LINE TYPE Solid
570     CLIP Xstrt,Xstp,Ystrt,Ystp
580     GRID 1.8,2.4,Xstrt,Ystrt,10,4,0.6
590     AXES 1.8,4.8,Xstrt,Ystrt,5,2,3
600     AXES 1.8,4.8,Xstp,Ystp,5,2,3
610     AXES 1.8,4.8,68,48.4,5,2,3
620     PEN Cyan
630     X$="870         970        1070        1170        1270        1370        1470"
640     Ltext(X$,11,5.5,0,3,0.6)
650     X$="1825        1925        2025        2125        2225        2325        2425"
660     Ltext(X$,11,87,0,3,0.6)
670     X$="0     20    40    60    80    A0    C0    E0   FF"
```

```
680     Ltext(X$,12,9,90,3,0.6)
690     Ltext(X$,127,9,90,3,0.6)
700     X$="Input Frequency (Hz)"
710     Ltext(X$,36,2,0,4,0.6)
720     X$="Output hexadecimal codes"
730     Ltext(X$,8,17,90,4,0.6)
740     PEN Yellow
750     X$="QUANTIZER OUTPUT CODING vs INPUT FREQUENCY"
760     Ltext(X$,15,92,0,5,0.4)
770     X$="low band"
780     Ltext(X$,80,40,325,5,0.4)
790     X$="high band"
800     Ltext(X$,70,35,325,5,0.4)
810   END IF
820   LINE TYPE Solid
830   GRAPHICS ON
840   !
850   PEN Yellow
860   LINE TYPE Solid
870   Ycor=(86.8-10)/256
880   Xcor=(122-14)/600
890   MOVE Freq(0)*Xcor+14,Ystrt
900   !
910   FOR Xc=0 TO 255
920     IF Ck=1228800 THEN
930       Xd=(Freq(Xc)-870)*Xcor+14
940     ELSE
950       Xd=(Freq(Xc)-1825)*Xcor+14
960     END IF
970     Yd=Xc*Ycor+10
980     DRAW Xd,Yd
990   NEXT Xc
1000  Graphics_pause
1010  RETURN
>>>>>> SUB Write_data_file(File$,DOUBLE Inf(*),Outdata(*))
>>>>>> SUB Read_data_file(File$,DOUBLE Inf(*),Indata(*))
>>>>>> SUB Beep_ok
>>>>>> SUB Beep_not_ok
>>>>>> SUB Beep_tick
>>>>>> SUB Prt_on
>>>>>> SUB Prt_off
>>>>>> SUB Display_func
>>>>>> SUB Set_screens
>>>>>> SUB Mask_bits(DOUBLE Addr,M$,DOUBLE X)
>>>>>> SUB Print_hex(DOUBLE X,Length,X$,Y$,Z$)
>>>>>> SUB Print_bin(DOUBLE X,Length,X$,Y$,Z$)
>>>>>> SUB Convert_hex(DOUBLE X,Length,Hex$)
>>>>>> SUB Convert_bin(DOUBLE X,Length,Bin$)
>>>>>> SUB Dbl_string(DOUBLE X,X$)
>>>>>> SUB Print_string(DOUBLE Xc,Yc,X$)
>>>>>> SUB Get_key(P$,X$)
>>>>>> SUB Get_item(DOUBLE Xc,Yc,Cur,X$,P$,C$)
>>>>>> SUB Edit_string(P$,X$,DOUBLE Cursor,Ins,Str,Stp)
>>>>>> SUB Gpinit
>>>>>> SUB Graphics_pause
>>>>>> SUB Grid(D$,REAL A,B,DOUBLE Line,Clor,OPTIONAL REAL X0,X1,X2,X3,X4)
>>>>>> SUB Ltext(L$,REAL X,Y,Dir,Csize,Aratio)
```

APPENDIX B, p. 2

```
10  ! FADR.SRC     JAN 85
20  ! FSK_demodulator, Filter adder
30  MASS STORAGE IS "103_DEM1:CS80,7"
40  OPTION BASE 0
50  DOUBLE If(127),Output(15),Addr,Ader,Q,C1,C2,Inum
60  MAT If=(0)
70  If(0)=4
80  If(1)=8
```

```
 90    Files="FADR.DATA"
100    !
110    PRINT PAGE
120    FOR Addr=0 TO 15
130       Mask_bits(Addr,"1000",Inum)
140       Mask_bits(Addr,"0100",Q)
150       Mask_bits(Addr,"0010",C1)
160       Mask_bits(Addr,"0001",C2)
170       !
180       IF Q=0 THEN Q=-1
190       IF C1=0 THEN C1=-1
200       IF C2=0 THEN C2=-1
210       !
220       SELECT Inum
230       CASE 0           ! 1st integrator
240          Ader=(Q-C1-C2)*2
250       CASE 1           ! 2nd integrator
260          Ader=C1
270       END SELECT
280       IF Ader<0 THEN Ader=256+Ader
290       !
300       Print_bin(Addr,4,""," ",";")
310       PRINT Ader
320       Output(Addr)=Ader
330    NEXT Addr
340    Write_data_file(File$,If(*),Output(*))
350    END
>>>>>> SUB Write_data_file(File$,DOUBLE Inf(*),Outdata(*))
>>>>>> SUB Read_data_file(File$,DOUBLE Inf(*),Indata(*))
>>>>>> SUB Beep_ok
>>>>>> SUB Beep_not_ok
>>>>>> SUB Beep_tick
>>>>>> SUB Prt_on
>>>>>> SUB Prt_off
>>>>>> SUB Display_func
>>>>>> SUB Set_screens
>>>>>> SUB Mask_bits(DOUBLE Addr,M$,DOUBLE X)
>>>>>> SUB Print_hex(DOUBLE X,Length,X$,Y$,Z$)
>>>>>> SUB Print_bin(DOUBLE X,Length,X$,Y$,Z$)
>>>>>> SUB Convert_hex(DOUBLE X,Length,Hex$)
>>>>>> SUB Convert_bin(DOUBLE X,Length,Bin$)
>>>>>> SUB Dbl_string(DOUBLE X,X$)
>>>>>> SUB Print_string(DOUBLE Xc,Yc,X$)
```

`Hex Dump of file :103 DEM1/FADR.DATA  16=8r (low byte)`

```
Addr    0  1  2  3  4  5  6  7   8  9  A  B  C  D  E  F
0000   02 FE FE FA 06 02 02 FE  FF FF 01 01 FF FF 01 01    .~~:..."&&..&:..
Ending address = 000F
```

APPENDIX C

```
 10    ! FCLK.SRC       JAN 85
 20    ! FSK_demodulator, Filter clock decoder
 30    MASS STORAGE IS "103_DEM1:CS80,7"
 40    OPTION BASE 0
 50    DOUBLE If(127),Output(7),Addr,Adr,Cout,Dcout,X
 60    DOUBLE E2e3,E0e2,E0e1
 70    DIM X$[40]
 80    MAT If=(0)
 90    If(0)=3
100    If(1)=8
110    File$="FCLK.DATA"
120    !
130    PRINT PAGE
140    FOR Addr=0 TO 7
150       SELECT Addr
160       CASE 4 TO 7
```

```
170       Adr=Addr-4
180     CASE 0 TO 3
190       Adr=7-Addr
200     END SELECT
210     Cout=DVAL("11110",2)
220     FOR X=1 TO Adr
230       Cout=BINAND(DSHIFT(Cout,-1)+1,31)
240     NEXT X
250     !
260     E2e3=E0e2=E0e1=1
270     X$=DVAL$(Cout,2)
280     X$=X$[28]
290     SELECT X$
300     CASE "10111"
310       E2e3=0
320     CASE "11011"
330       E2e3=E0e2=0
340     CASE "11101"
350       E0e1=0
360     CASE "11110"
370       E0e2=E0e1=0
380     END SELECT
390     Dcout=(E2e3*4)+(E0e2*2)+(E0e1)
400     !
410     Print_hex(Addr,4,""," ",";")
420     Print_bin(Cout,5,"";" ",";")
430     Print_bin(Dcout,3,"","",".")
440     Output(Addr)=(Cout*8)+Dcout
450   NEXT Addr
460   Write_data_file(File$,If(*),Output(*))
470   END
```

**Hex Dump of File = 103_DEM1/FCLK:DATA  8*8 (1 ou byte)**

| Addr | 0 1 2 3 4 5 6 7 | 8 9 A B C D E F |
|------|------|------|
| 0000 | FF FF FF 7F F4 EE D9 BB | Ending address = 0007 |

APPENDIX D

```
10  ! FDOD.SRC      JAN 85
20  ! FSK_demodulator, Output deglitcher
30  MASS STORAGE IS "103_DEM1:CS80,7"
40  OPTION BASE 0
50  DOUBLE If(127),Output(31),Addr,Op,A,C
60  MAT If=(0)
70  If(0)=5
80  If(1)=4
90  File$="FDOD.DATA"
100 !
110 PRINT PAGE
120 FOR Addr=0 TO 31
130   Mask_bits(Addr,"10000",A)
140   Mask_bits(Addr,"01111",C)
150   !
160   IF A=0 THEN
170     SELECT C
180     CASE 8
190       Op=0
200     CASE 1 TO 15
210       Op=C-1
220     CASE 0
230       Op=C
240     END SELECT
250   ELSE
260     SELECT C
270     CASE 7
280       Op=15
290     CASE 0 TO 14
```

```
300        Op=C+1
310      CASE 15
320        Op=C
330     END SELECT
340    END IF
350    !
360    Print_hex(Addr,4,""," ",";")
370    Print_hex(Op,4,"","",".")
380    Output(Addr)=Op
390  NEXT Addr
400  Write_data_file(File$,If(*),Output(*))
410  END
```

Hex Dump of file: 103 DEM1/FDOD DATA: 32*4 (low byte)

```
Addr  0  1  2  3  4  5  6  7   8  9  A  B  C  D  E  F
0000  00 00 01 02 03 04 05 06  00 08 09 0A 0B 0C 0D 0E     ................
0010  01 02 03 04 05 06 07 0F  09 0A 0B 0C 0D 0E 0F 0F     ................
Ending address = 001F
```

APPENDIX E

```
1000 ' FSK DEMOD LINEARIZATION ROM **** MAR 84 ****************** FDLR.BAS **
1010 WIDTH 255: DEFINT X,H,L,N,O,Q: DEFDBL C,F,V,Y,B: DIM O(255): VCEN=&H80
1020 DEF FNF1 (H,L,N,CK,XC,Q)=(H*CK) / ((H*L*N)+(2*Q*XC*(H-L)))
1030 DEF FNV1 (FREQ,FCEN)=(LOG(FREQ/FCEN)) *CR
1040 '********************************************************************
1050 H=23: L=13: N=64: CK=1.2288E+06: FL=1070: FH=1270: VQ=&HF0-VCEN: VOV=10
1060   OFS=0:     Q=4: B=11: GOSUB 1130: PRINT
1070 '********************************************************************
1080 H=22: L=16: N=64: CK=2.4576E+06: FL=2025: FH=2225: VQ=&HF0-VCEN: VOV=10
1090   OFS=&H80:  Q=4: B=11: GOSUB 1130: PRINT
1100 '********************************************************************
1110 OPEN "O",#1,"B:FDLR"
1120   FOR X=0 TO 255: PRINT #1,CHR$(O(X));: NEXT: CLOSE: RESET: END
1130 '********************************************************************
1140   FCEN=SQR(FL*FH): CR=(VQ-VOV)/(LOG(FH/FCEN))
1150   VMX=VCEN+VQ-B: VMN=VCEN-VQ-B
1160     FOR XC=0 TO 127
1170       FRQ=FNF1(H,L,N,CK,XC,Q)
1180       O  =CINT((FNV1(FRQ,FCEN))+VCEN-B)
1190       IF O>VMX THEN O=VMX ELSE IF O<VMN THEN O=VMN
1200       O(XC+OFS)=O
1210       PRINT USING "###    ####.##    \\"; XC,FRQ,HEX$(O)
1220     NEXT: RETURN
```

What is claimed is:

1. A digital frequency shift keying (FSK) demodulator which receives an FSK input signal and recovers a modulating baseband signal, the FSK demodulator comprising,
 (a) means for receiving the FSK input signal and generating a corresponding pulse width modulated serial bit stream;
 (b) means for transforming the pulse width modulated serial bit stream into an output signal comprising parallel bits representative of the frequency of the FSK input signal; and
 (c) means for processing the output signal utilizing pulse density modulation to provide the recovered modulating baseband signal.

2. A digital FSK demodulator as in claim 1 wherein the means for receiving comprises a digital phase locked loop.

3. A digital FSK demodulator as in claim 2 wherein the means for transforming includes a code linearizer comprising a look-up table for improving linearity and reducing bit-bias distortion in the recovered modulating baseband signal.

4. A digital frequency shift keying (FSK) demodulator which receives an FSK input signal and recovers a modulating base and signal, the FSK demodulator comprising,
 (a) a digital phase locked loop for receiving the FSK input signal and generating a corresponding pulse width modulated serial bit stream;
 (b) means for transforming the pulse width modulated serial bit stream into an output signal comprising parallel bits representative of the frequency of the FSK input signal; and
 (c) means for processing the output signal utilizing pulse density modulation to provide the recovered modulating baseband signal, the processing means comprising means for translating the output signal into a pulse density modulated serial bit stream;

means for summing the output signal of the translating means, the output signal of said first integrator and the output signal of said second integrator;

a first integrator which accumulates the output signal of the summing means; and a second integrator which receives an input signal from the first integrator and generates the recovered modulating baseband signal.

5. A digital FSK demodulator as in claim 4 and further including means for removing noise from the recovered modulating baseband signal.

6. A method of recovering a modulating baseband signal from an FSK modulated signal, the method comprising:

(a) processing the FSK signal to generate a pulse width modulated serial bit stream the pulse width of which is a function of the frequency of the FSK signal;

(b) quantizing the pulse width modulated serial bit stream to generate a corresponding output signal comprising parallel bits representative of the frequency of the FSK signal; and (c) filtering the output signal utilizing pulse density modulation to generate the recovered modulating baseband signal.

7. A method of recovering modulating baseband signal from a frequency shift keying (FSK) modulated signal, the method comprising:

(A) processing the FSK signal to generate a pulse width modulated serial bit stream then pulse width of which is a function of the frequency of the FSK signal;

(b) quantizing the pulse width modulated serial bit stream to generate a corresponding output signal comprising parallel bits representative of the frequency of the FSK signal;

(c) translating the output signal into a pulse density modulated serial bit stream;

(d) summing the serial bit stream the output signal of a first integrator and the output signal of a second integrator;

(e) accumulating the sum generated in step (d) to produce the first integrator output signal; and (f) accumulating the first integrator output signal in the second integrator to produce the second integrator output signal.

8. A method as in claim 7 including the further step of removing noise from the recovered modulating baseband signal.

9. A digital frequency shift keying (FSK) demodulator which receives an FSK input signal and recovers a modulating baseband signal, the FSK demodulator comprising, (a) a digital phase locked loop demodulator means which receives the FSK input signal and generates a pulse width modulated serial bit stream corresponding to the input signal;

(b) a quantizer which transforms the serial bit stream into an output signal comprising parallel bits representative of the frequency of the FSK input signal;

(c) a code linearizer which translates the outputs signal from the quantizer into optimized corresponding signals; and (d) means for pulse density modulating the optimized corresponding signals to recover the modulating baseband signal.

10. A digital frequency shift keying (FSK) demodulator which receives an FSK input signal and recovers a modulating baseband signal, the FSK demodulator comprising:

(a) a digital phase locked loop demodulator means which receives the FSK input signal and generates a pulse width modulated serial bit stream corresponding to the input signal;

(b) a quantizer which transforms the serial bit stream into an output signal comprising parallel bits representative of the frequency of the FSK input signal;

(c) a code linearizer which translates the output signal from the quantizer into optimized corresponding signals;

(d) means for pulse density modulating the optimized corresponding signals to recovering the modulating baseband signal utilizing a plurality of cycles; and (e) a clock generator for arbitrating the cycles of the pulse density modulating means.

* * * * *